US008314998B2

(12) United States Patent
Asami

(10) Patent No.: US 8,314,998 B2
(45) Date of Patent: Nov. 20, 2012

(54) IMAGING LENS AND IMAGING APPARATUS

(75) Inventor: Taro Asami, Saitama (JP)

(73) Assignee: Fujifilm Corporation, Tokyo (JP)

( * ) Notice: Subject to any disclaimer, the term of this patent is extended or adjusted under 35 U.S.C. 154(b) by 148 days.

(21) Appl. No.: 12/845,379

(22) Filed: Jul. 28, 2010

(65) Prior Publication Data

US 2011/0026138 A1 Feb. 3, 2011

(30) Foreign Application Priority Data

Jul. 29, 2009 (JP) .............................. P2009-175986
Jun. 2, 2010 (JP) .............................. P2010-126631

(51) Int. Cl.
*G02B 3/02* (2006.01)
*G02B 9/34* (2006.01)

(52) U.S. Cl. ....................................... 359/715; 359/781

(58) Field of Classification Search .................. 359/715, 359/781
See application file for complete search history.

(56) References Cited

U.S. PATENT DOCUMENTS

| 2006/0187557 | A1 | 8/2006 | Yamakawa |
| 2007/0183062 | A1 | 8/2007 | Nakamura |
| 2009/0122422 | A1 | 5/2009 | Yoshida et al. |
| 2010/0103534 | A1* | 4/2010 | Iyama ........................... 359/717 |

FOREIGN PATENT DOCUMENTS

| EP | 1712943 A1 | 10/2006 |
| JP | 2002-244031 A | 8/2002 |
| JP | 2005-227426 A | 8/2005 |
| JP | 2006-259704 A | 9/2006 |
| JP | 2007-206516 A | 8/2007 |

* cited by examiner

*Primary Examiner* — William Choi
(74) *Attorney, Agent, or Firm* — Birch, Stewart, Kolasch & Birch, LLP

(57) ABSTRACT

Disclosed is an imaging lens that has a wide angle of view, a small size in the diametric direction of a lens system, and a good optical performance. An imaging lens includes a first negative lens having a meniscus shape in which a concave surface faces an image side, a second negative lens having a meniscus shape in which a concave surface faces the image side and including at least one aspheric surface, a third positive lens including at least one aspheric surface, an aperture diaphragm, and a fourth positive lens including at least one aspheric surface, which are arranged in this order from an object side. The imaging lens satisfies the following Conditional expression 1: f2/f<−4.5, where f indicates the focal length of the entire system and f2 indicates the focal length of the second lens.

12 Claims, 19 Drawing Sheets

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

FIG. 13A FIG. 13B FIG. 13C FIG. 13D
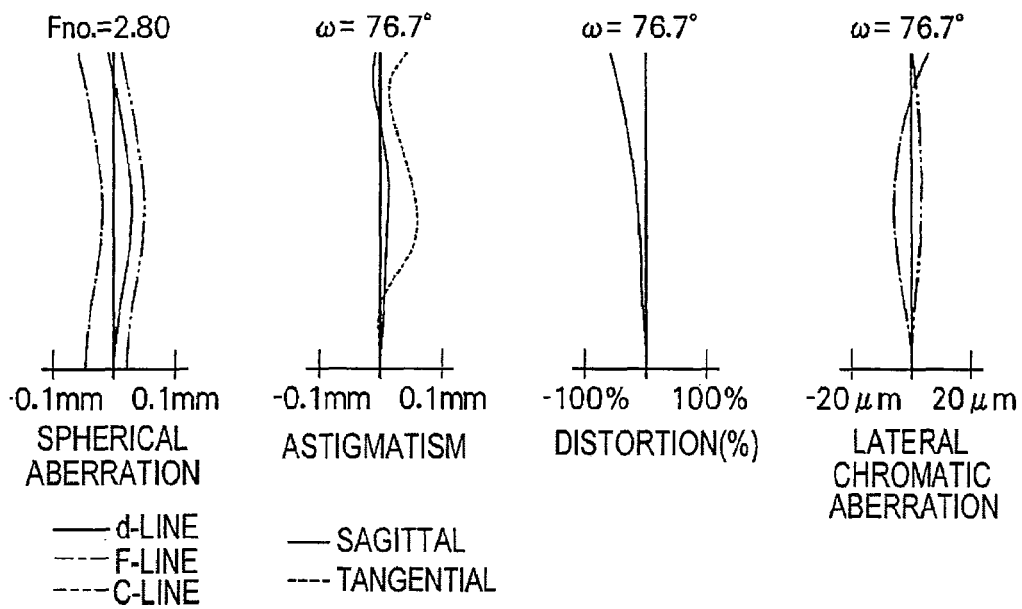
EXAMPLE 1
FIG. 13E      FIG. 13H
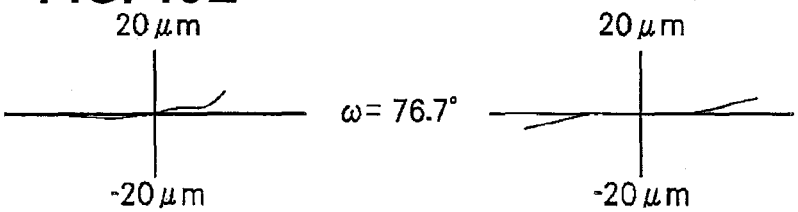
FIG. 13F      FIG. 13I
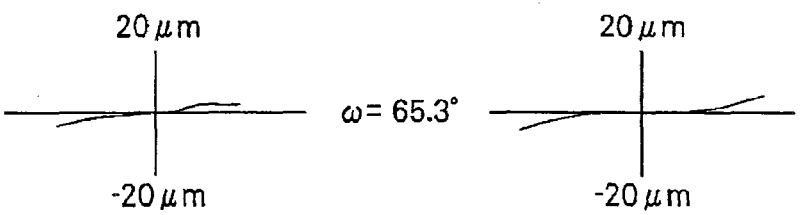
FIG. 13G
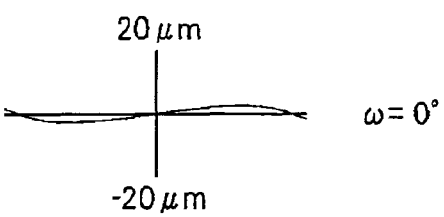

EXAMPLE 2

ω= 77.2°

ω= 65.7°

ω= 0°

EXAMPLE 3

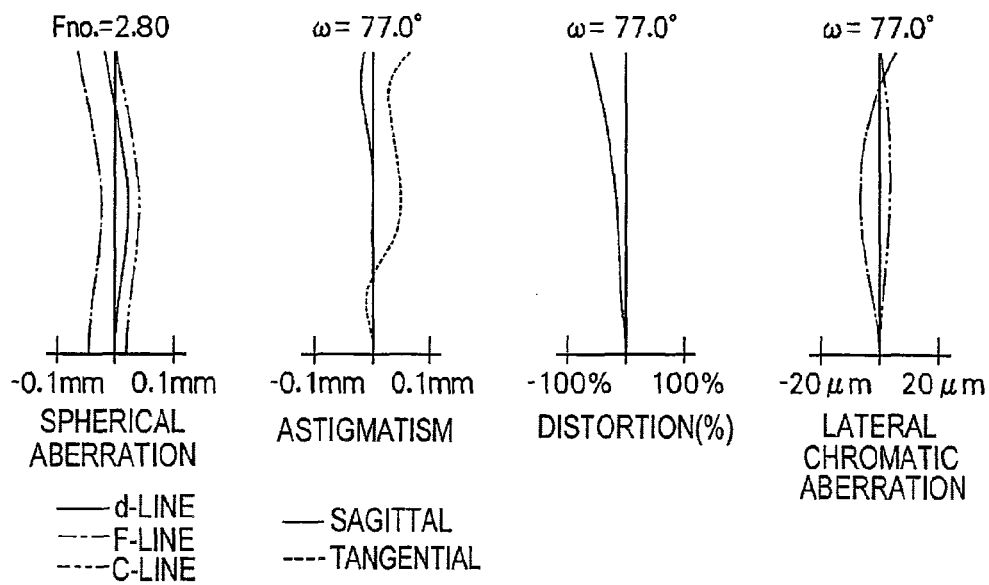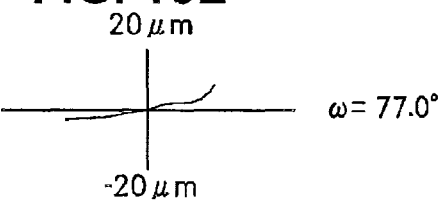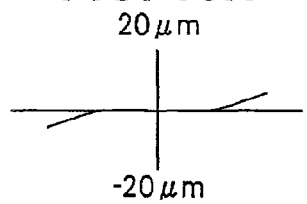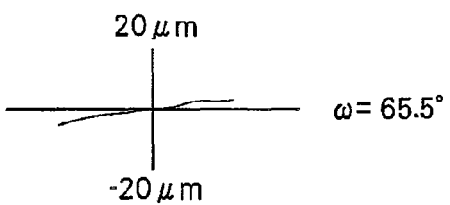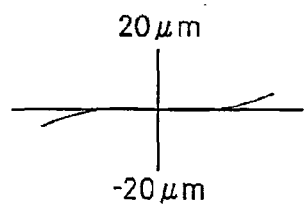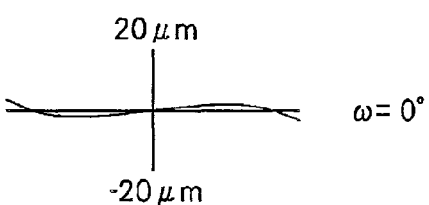

EXAMPLE 5

FIG. 17A: Fno.=2.80, Spherical Aberration (-0.1mm to 0.1mm), d-LINE, F-LINE, C-LINE
FIG. 17B: ω=77.0°, Astigmatism (-0.1mm to 0.1mm), SAGITTAL, TANGENTIAL
FIG. 17C: ω=77.0°, Distortion(%) (-100% to 100%)
FIG. 17D: ω=77.0°, Lateral Chromatic Aberration (-20μm to 20μm)

ω=77.0°

ω=65.5°

ω=0°

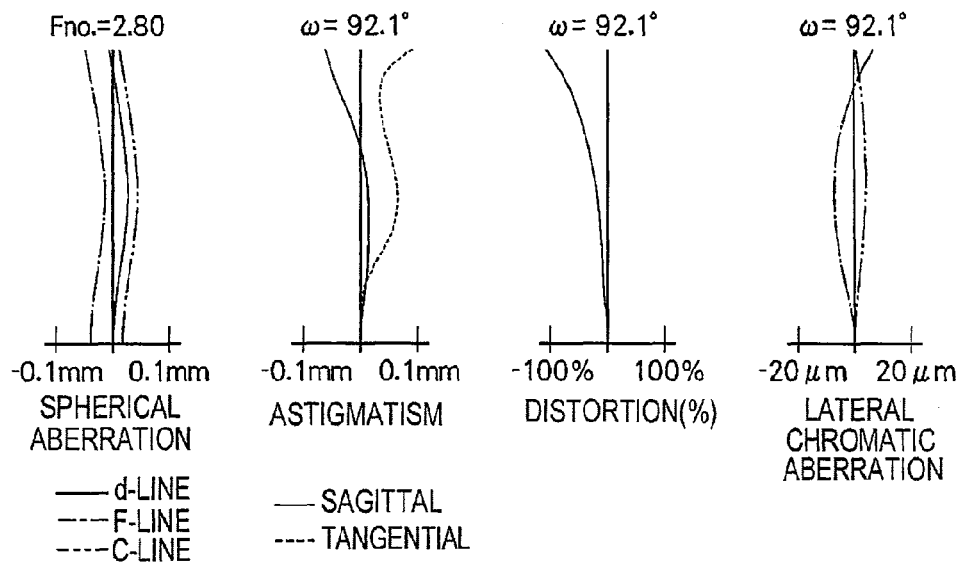
FIG. 18A  FIG. 18B  FIG. 18C  FIG. 18D
EXAMPLE 6
FIG. 18E
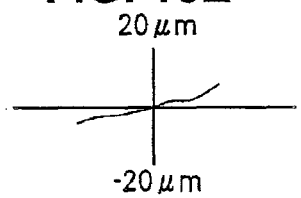
ω= 92.1°
FIG. 18H
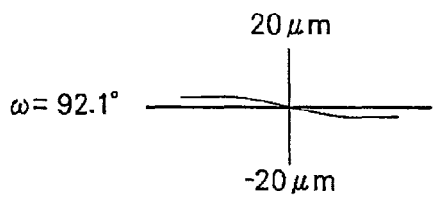
FIG. 18F
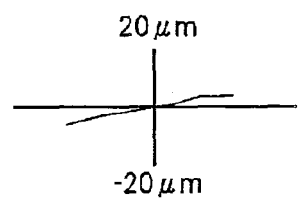
ω= 72.9°
FIG. 18I
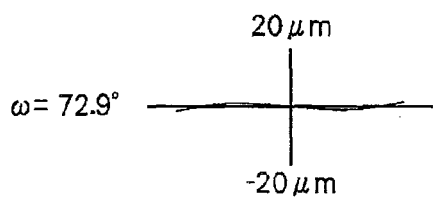
FIG. 18G
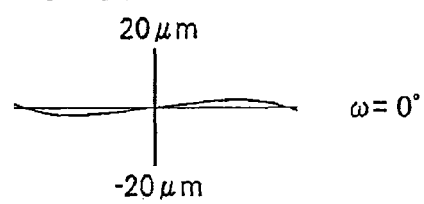
ω= 0°

FIG. 19A  FIG. 19B  FIG. 19C  FIG. 19D
EXAMPLE 7
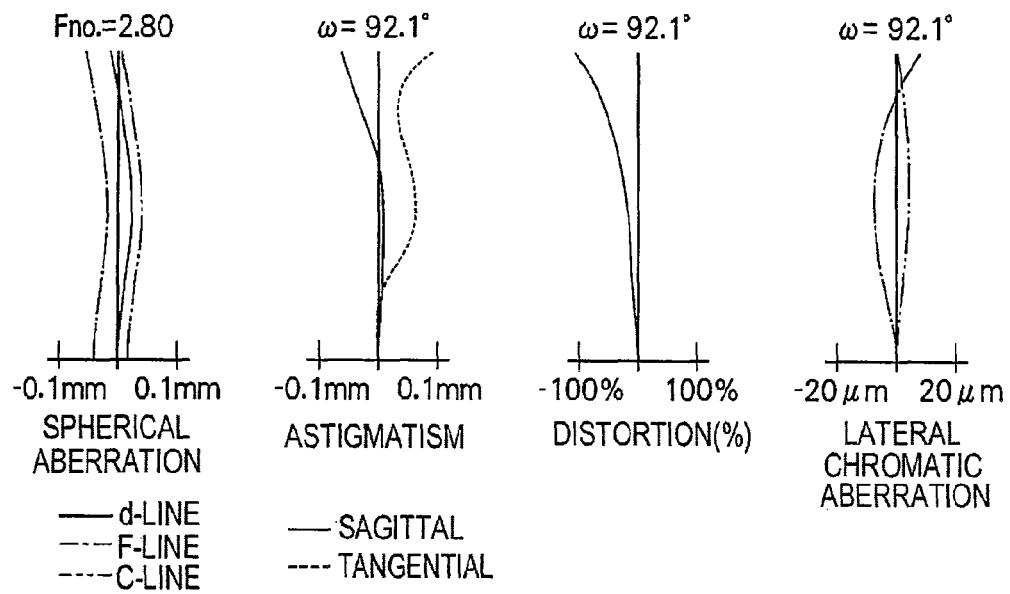
FIG. 19E  FIG. 19H
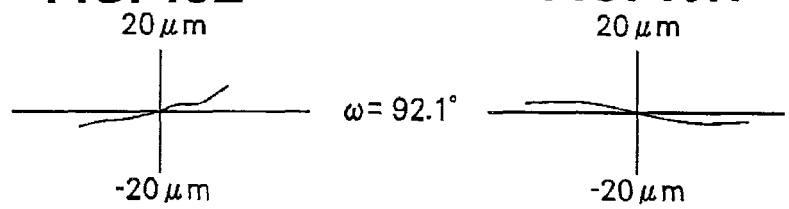 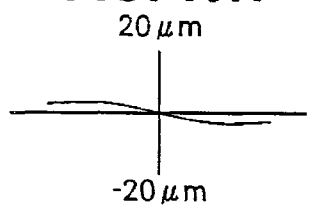
FIG. 19F  FIG. 19I
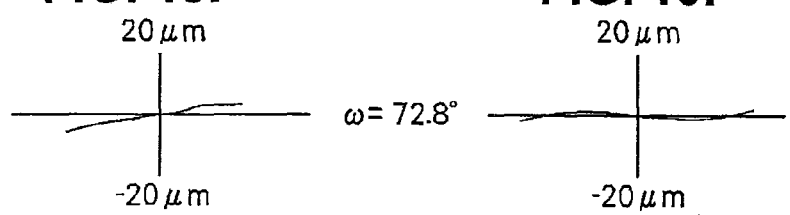 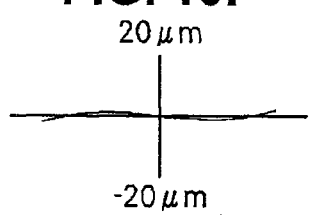
FIG. 19G
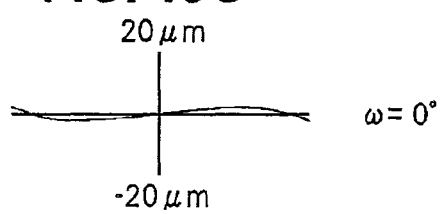

EXAMPLE 8

Fno.=2.80 | ω= 92.2° | ω= 92.2° | ω= 92.2°

-0.1mm  0.1mm | -0.1mm  0.1mm | -100%  100% | -20μm  20μm
SPHERICAL ABERRATION | ASTIGMATISM | DISTORTION(%) | LATERAL CHROMATIC ABERRATION

—— d-LINE
--- F-LINE
---- C-LINE

—— SAGITTAL
---- TANGENTIAL

ω= 92.2°

ω= 71.0°

ω= 0°

EXAMPLE 10

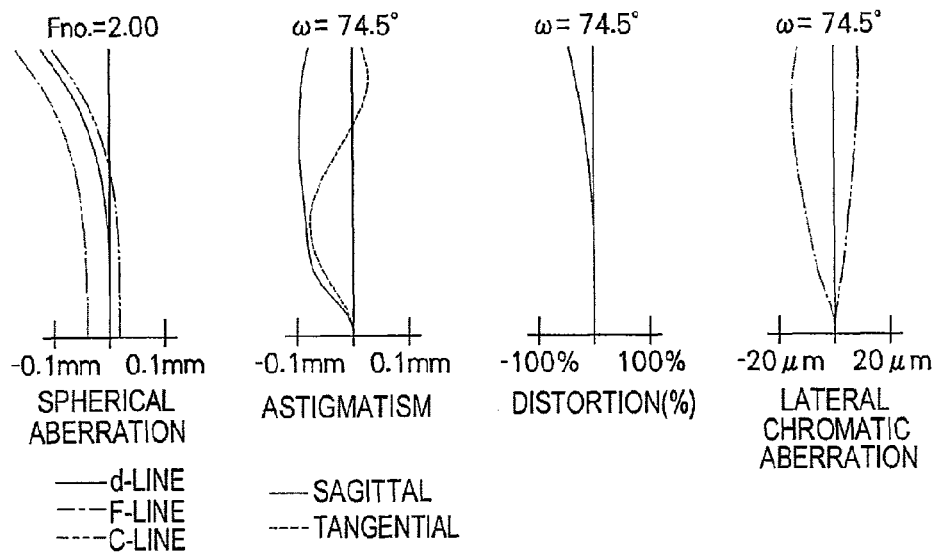
FIG. 23A  FIG. 23B  FIG. 23C  FIG. 23D
EXAMPLE 11
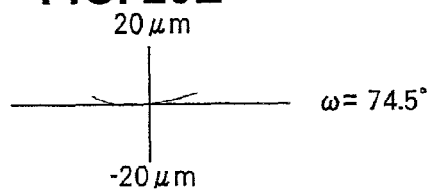
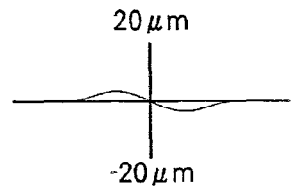
FIG. 23E  FIG. 23H
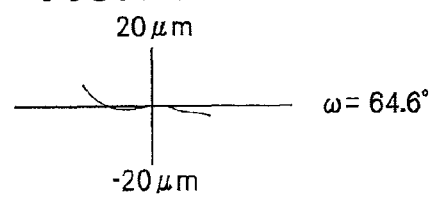
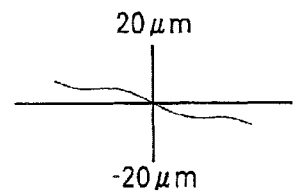
FIG. 23F  FIG. 23I
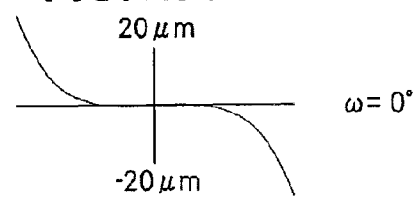
FIG. 23G

IMAGING LENS AND IMAGING APPARATUS

CROSS-REFERENCE TO RELATED APPLICATIONS

This application is based upon and claims the benefit of priority from the Japanese Patent Application Nos. 2009-175986 filed on Jul. 29, 2009 and 2010-126631 filed on Jun. 2, 2010; the entire contents of which are incorporated herein by reference.

BACKGROUND OF THE INVENTION

1. Field of the Invention

The present invention relates to an imaging lens and an imaging apparatus, and more particularly, to an imaging lens suitable for, for example, an in-vehicle camera, a camera for a portable terminal, and a monitoring camera using an imaging device, such as a CCD (Charge Coupled Device) or a CMOS (Complementary Metal Oxide Semiconductor), and an imaging apparatus including the imaging lens.

2. Description of the Related Art

In recent years, the size of an imaging device, such as a CCD or a CMOS has been significantly reduced and the number of pixels thereof has significantly increased. In addition, the size of an imaging apparatus body including the imaging device has been reduced, and there is an increasing demand for an imaging lens with a good optical performance and a small size. For example, there is a demand for a lens that is provided in, for example, the in-vehicle camera or the monitoring camera and has a small size, high weather resistance, a light weight, and a low manufacturing cost.

For example, JP-A-2002-244031, JP-A-2005-227426, JP-A-2006-259704, and JP-A-2007-206516 disclose an imaging lens including a relatively small number of lenses, which has been known in this field. JP-A-2002-244031, JP-A-2005-227426, JP-A-2006-259704, and JP-A-2007-206516 disclose an imaging lens having four lenses including an aspheric lens.

However, in recent years, there is an increasing demand for a wide-angle lens provided in, for example, the in-vehicle camera or the monitoring camera, in addition to the above-mentioned structure demands. However, as in the related art, when only the angle of view of the lens is increased, the effective diameter of a lens that is arranged closest to the object side increases with the increase in the angle of view and the diameter of the lens increases, which makes it difficult to reduce the size of the lens. In particular, in the in-vehicle camera or the camera for a portable terminal, there is a demand for a lens in which a small portion is exposed to the outside such that the outward appearance does not deteriorate. Therefore, there is a strong desire to reduce the size of the lens system in the diametric direction. For example, in the monitoring camera, it is necessary to reduce the size of the lens system in the diametric direction in order to make the camera as invisible as possible. That is, there is a demand for a lens system capable of meeting two opposite requirements, that is, an increase in the angle of view and a reduction in the size of the lens system in the diametric direction.

SUMMARY OF THE INVENTION

The invention has been made in order to solve the above-mentioned problems, and an object of the invention is to provide an imaging lens that is capable of reducing the size of a lens system in the diametric direction, which results in a small size, while obtaining a wide angle of view and has a good optical performance, and an imaging apparatus including the imaging lens.

A first imaging lens according to the invention includes a first negative lens having a meniscus shape in which a concave surface faces an image side, a second negative lens having a meniscus shape in which a concave surface faces the image side and including at least one aspheric surface, a third positive lens including at least one aspheric surface, an aperture diaphragm, and a fourth positive lens including at least one aspheric surface, which are arranged in this order from an object side. The imaging lens satisfies the following Conditional expression 1:

$f2/f < -4.5$  [Conditional expression 1]

(where f indicates the focal length of the entire system and f2 indicates the focal length of the second lens).

A second imaging lens according to the invention includes a first negative lens having a meniscus shape in which a concave surface faces an image side, a second negative lens having a meniscus shape in which a concave surface faces the image side and including at least one aspheric surface, a third positive lens including at least one aspheric surface, an aperture diaphragm, and a fourth positive lens including at least one aspheric surface, which are arranged in this order from an object side. The imaging lens satisfies the following Conditional expression 2:

$4.0 < ED1/D1 < 15.0$  [Conditional expression 2]

(where ED1 indicates the effective diameter of an object-side surface of the first lens and D1 indicates the thickness of the center of the first lens).

The first and second imaging lenses according to the invention may satisfy the following Conditional expressions 3 to 10:

$DX3 \geq 0.5$ mm;  [Conditional expression 3]

$4.0 < |RX3|/f;$  [Conditional expression 4]

$0.7 < R3/f < 1.3;$  [Conditional expression 5]

$7.5 < L/f < 11.0;$  [Conditional expression 6]

$-8.0 < f1/f < -3.0;$  [Conditional expression 7]

$0.3 < D2/f < 0.6;$  [Conditional expression 8]

$-3.5 < f12/f < -0.7;$ and  [Conditional expression 9]

$15 < R1/f < 30$  [Conditional expression 10]

(where DX3 indicates the distance between an intersection point between the optical axis and a perpendicular line that drops from the effective diameter edge to the optical axis and the center of the object-side surface of the second lens in an optical axis direction when the effective diameter edge is arranged closer to the image side than to an intersection point between the object-side surface and the optical axis, f indicates the focal length of the entire system, RX3 indicates the curvature radius of the object-side surface of the second lens at the effective diameter edge, R3 indicates the curvature radius of the object-side surface of the second lens at the center, L indicates the distance from an object-side surface of the first lens to an image plane in the optical axis direction (a back focal length is an air-equivalent length), f1 indicates the focal length of the first lens, D2 indicates an air space between the first lens and the second lens on the optical axis, f12 indicates a composite focal length of the first lens and the second lens, and R1 indicates the curvature radius of the object-side surface of the first lens).

As a preferred aspect, the first and second imaging lenses may satisfy any one of the following Conditional expressions 3 to 10 or a combination of two or more Conditional expressions.

In the first and second imaging lenses according to the invention, the 'meniscus shape in which a concave surface faces the image side' is considered in a paraxial region of the aspheric lens. In the first and second imaging lenses according to the invention, the 'negative' or 'positive' power (refractive power) is considered in the paraxial region. In the imaging lenses according to the invention, when a surface is convex to the object side, the curvature radius of the surface is positive, and when a surface is convex to the image side, the curvature radius of the surface is negative.

When intersections points between all light beams contributing to forming an image and the lens surface are considered, the 'effective diameter of the surface' means the diameter of a circle formed by the outermost points (points furthest away from the optical axis) in the diametric direction, and the 'effective diameter edge' means the outermost point. In the system that is rotationally symmetric with respect to the optical axis, the outermost points form a circle. However, in the system that is not rotationally symmetric, the outermost points may not form a circle. In this case, the diameter of an equivalent circle may be used as the effective diameter.

An imaging apparatus according to the invention includes the imaging lens according to the invention.

According to the first imaging lens of the invention, in the lens system including at least four lenses, the shapes of the first lens and the second lens are appropriately set, an aspheric surface is provided in each of the second to fourth lenses, and the arrangement of the power of the entire system and the position of the aperture diaphragm are appropriately set, such that the imaging lens satisfies Conditional expression 1. Therefore, it is possible to achieve an imaging lens that has a wide angle of view, a small lens system in the diametric direction, a small size, and a good optical performance.

According to the second imaging lens of the invention, in the lens system including at least four lenses, the shapes of the first lens and the second lens are appropriately set, an aspheric surface is provided in each of the second to fourth lenses, and the arrangement of the power of the entire system and the position of the aperture diaphragm are appropriately set, such that the imaging lens satisfies Conditional expression 2. Therefore, it is possible to achieve an imaging lens that has a wide angle of view, a small lens system in the diametric direction, a small size, and a good optical performance.

The imaging apparatus according to the invention includes the first imaging lens or the second imaging lens according to the invention. Therefore, it is possible to reduce the area of the lens exposed to the outside and the size of the imaging apparatus, and obtain a high-quality image at a wide angle of view.

BRIEF DESCRIPTION OF THE DRAWINGS

FIGS. 13A to 13I are diagrams illustrating aberrations of the imaging lens according to Example 1 of the invention;

FIGS. 16A to 16I are diagrams illustrating aberrations of the imaging lens according to Example 4 of the invention;

FIGS. 18A to 18I are diagrams illustrating aberrations of the imaging lens according to Example 6 of the invention;

FIGS. 19A to 19I are diagrams illustrating aberrations of the imaging lens according to Example 7 of the invention;

FIGS. 23A to 23I are diagrams illustrating aberrations of the imaging lens according to Example 11 of the invention.

DESCRIPTION OF THE PREFERRED EMBODIMENTS

Figure 1:
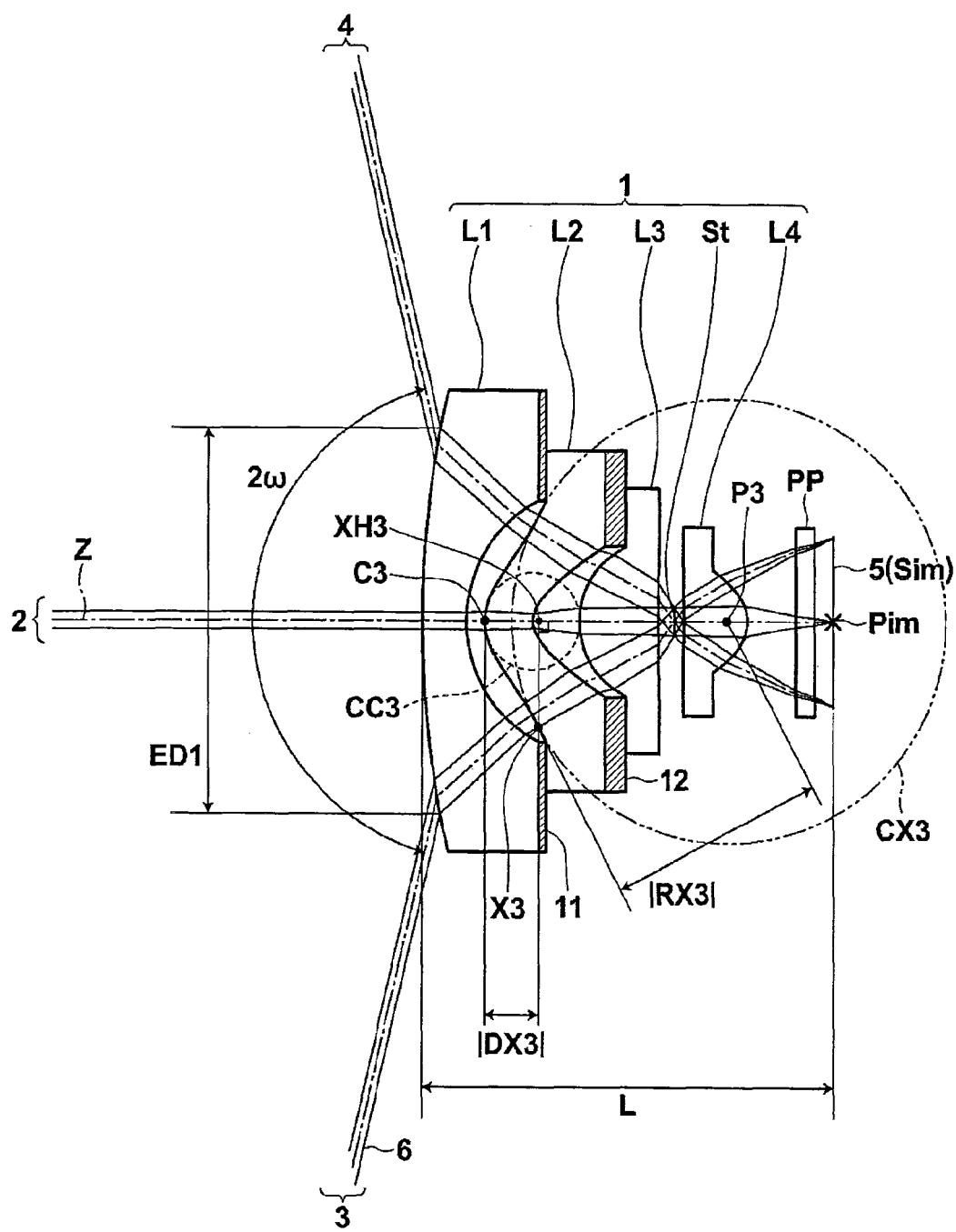
FIG. 1 is a diagram illustrating the structure of an imaging lens according to an embodiment of the invention.

Hereinafter, exemplary embodiments of the invention will be described in detail with reference to the accompanying drawings. First, an imaging lens according to an embodiment of the invention will be described with reference to FIG. 1. FIG. 1 is a cross-sectional view illustrating an imaging lens 1 according to an embodiment of the invention and shows on-axis light beams 2 from an object point that is disposed at an infinite distance and off-axis light beams 3 and 4 at a total angle of view 2ω. In FIG. 1, the left side is an object side and the right side is an image side.

FIG. 1 also shows an imaging device 5 that is provided on an image plane Sim including an image point Pim of the imaging lens 1, considering the case in which the imaging lens 1 is applied to an imaging apparatus. The imaging device 5 converts an optical image formed by the imaging lens 1 into electric signals, and may be, for example, a CCD image sensor or a CMOS image sensor.

When the imaging lens 1 is applied to an imaging apparatus, it is preferable to provide a cover glass, a low pass filter, or an infrared cut filter according to the structure of a camera provided with the lens. FIG. 1 shows an example in which a parallel-plate-shaped optical member PP is arranged between a lens that is arranged closest to the image side and the imaging device 5 (image surface Sim), considering the above-mentioned case.

The imaging lens 1 includes as basic components a first negative lens L1, which is a meniscus lens having a concave surface facing the image side, a second negative lens L2, which is a meniscus lens having a concave surface facing the image side and including at least one aspheric surface, a third positive lens L3 including at least one aspheric surface, an aperture diaphragm St, and a fourth positive lens L4 including at least one aspheric surface, which are arranged in this order from the object side. FIG. 1 does not show the shape or size of the aperture diaphragm St, but shows the position of the aperture diaphragm St on the optical axis Z.

The imaging lens includes a small number of lenses, for example, four lenses. Therefore, it is possible to reduce manufacturing costs and reduce the total length of the lens in the optical axis direction. Since three lenses, that is, the second lens L2, the third lens L3, and the fourth lens L4 are aspheric lenses, it is possible to effectively correct all aberrations with a small number of lenses. Therefore, it is possible to reduce the size of the lens and improve the optical performance.

Since two lenses arranged on the object side, that is the first lens L1 and the second lens L2 are both negative meniscus lenses having a concave surface facing the image side, it is possible to capture light beams at a wide angle of view and achieve a wide-angle lens system. In addition, since two negative lenses are provided, the function of correcting each aberration required for the negative lenses can be shared by the two lenses, and it is possible to effectively correct aberration.

Since each of the third lens L3 and the fourth lens L4 has a positive power and includes at least one aspheric surface, it is possible to effectively correct field curvature. Since two positive lenses, that is, the third lens L3 and the fourth lens L4 are arranged on the image side, the function of focusing an image on the image surface and the function of correcting each aberration required for the positive lens can be shared by the two lenses, and it is possible to effectively correct aberration.

Since the aperture diaphragm St is arranged between the third lens L3 and the fourth lens L4, it is possible to reduce the light beam height of the first lens L1, as compared to the structure in which the aperture diaphragm St is arranged on the image side of the fourth lens L4. Therefore, it is possible to reduce the size of the lens system in the diametric direction. In addition, it is easy to correct field curvature and lateral chromatic aberration.

The imaging lens 1 shown in FIG. 1 includes the following first and second aspects, in addition to the above-mentioned basic structure. In the first aspect, when the focal length of the entire system is f and the focal length of the second lens L2 is f2, the imaging lens 1 satisfies the following Conditional expression 1:

$$f2/f < -4.5.\qquad\text{[Conditional expression 1]}$$

If the upper limit of Conditional expression 1 is satisfied, it is possible to prevent the power of the second lens L2 from being too strong and thus prevent a light beam from being refracted at a large angle by the second lens L2. Therefore, it is possible to reduce the light beam height of the first lens L1. As a result, it is possible to reduce the size of the lens system in the diametric direction.

In addition, it is preferable that the imaging lens satisfy the following Conditional expression 1-2:

$$-20.0 < f2/f < -5.0.\qquad\text{[Conditional expression 1-2]}$$

If the upper limit of Conditional expression 1-2 is satisfied, it is easy to reduce the size of the lens system in the diametric direction. If the lower limit of Conditional expression 1-2 is satisfied, it is possible to prevent the power of the second lens L2 from being too weak and set the power of the second lens L2 to an appropriate value. Therefore, it is possible to increase the angle of view and a back focal length. When the power of the second lens L2 is too weak, the light beam needs to be refracted at a large angle by the first lens L1 in order to increase the angle of view. Therefore, it is difficult to correct distortion.

In order to easily reduce the size of the lens system in the diametric direction, increase the angle of view, ensure a back focal length, and correct distortion, it is preferable that the imaging lens satisfy the following Conditional expression 1-3:

$$-12.0 < f2/f < -5.2.\qquad\text{[Conditional expression 1-3]}$$

In the second aspect, when the effective diameter of an object-side surface of the first lens L1 is ED1 and the thickness of the center of the first lens L1 is D1, the imaging lens satisfies the following Conditional expression 2:

$$4.0 < ED1/D1 < 15.0.\qquad\text{[Conditional expression 2]}$$

If the ratio is more than the upper limit of Conditional expression 2, the effective diameter of the object-side surface of the first lens L1 increases, which results in an increase in the size of the lens system in the diametric direction, or the thickness of the center of the first lens L1 is too small, which may cause the first lens L1 to be broken easily. When the imaging lens is used as, for example, an in-vehicle camera, it is preferable that the first lens L1 be thick and be less likely to be broken since the first lens needs to be resistant to various kinds of impact. If the ratio is less than the lower limit of Conditional expression 2, it is easy to reduce the size of the lens system in the diametric direction, but the effective diameter of the object-side surface of the first lens L1 is too small. Therefore, it is difficult to separate the on-axis light beam from the off-axis light beam and thus effectively correct field curvature and distortion, or the thickness of the first lens L1 is too large, which results in an increase in the size of the lens system in the optical axis direction.

In order to more easily obtain the effects when Conditional expression 2 is satisfied, that is, in order to more easily reduce the size of the lens system in the diametric direction and the optical axis direction and correct field curvature and distortion, it is preferable that the imaging lens satisfy the following Conditional expression 2-2:

$$5.0 < ED1/D1 < 12.0.\qquad\text{[Conditional expression 2-2]}$$

In order to more easily obtain the effects when Conditional expression 2-2 is satisfied, that is, in order to more easily reduce the size of the lens system in the diametric direction and the optical axis direction and correct field curvature and distortion, it is preferable that the imaging lens satisfy the following Conditional expression 2-3:

$$6.0 < ED1/D1 < 11.0.\qquad\text{[Conditional expression 2-3]}$$

In order to more easily obtain the effects when Conditional expression 2-3 is satisfied, that is, in order to more easily reduce the size of the lens system in the diametric direction and the optical axis direction and correct field curvature and distortion, it is preferable that the imaging lens satisfy the following Conditional expression 2-4:

$$7.0 < ED1/D1 < 10.0.\qquad\text{[Conditional expression 2-4]}$$

In order to more easily obtain the effects when Conditional expression 2-4 is satisfied, that is, in order to more easily reduce the size of the lens system in the diametric direction and the optical axis direction and correct field curvature and distortion, it is preferable that the imaging lens satisfy the following Conditional expression 2-5:

$$8.0<ED1/D1<9.5.\qquad\text{[Conditional expression 2-5]}$$

The imaging lens including the first aspect may include the structure of the second aspect or a preferred structure according to the second aspect. Similarly, the imaging lens including the second aspect may include the structure according to the first aspect.

It is preferable that the imaging lens including the first or second aspect have the following structures. As a preferred aspect, the imaging lens may have any one of the following structures or a combination of two or more structures.

The object-side surface of the second lens L2 is configured such that an effective diameter edge is disposed at a position closer to the image side than an intersection point between the object-side surface and the optical axis. When the distance between an intersection point between the optical axis Z and a perpendicular line that drops from the effective diameter edge to the optical axis Z and the center of the object-side surface in the optical axis direction is DX3, it is preferable that the imaging lens satisfy the following Conditional expression 3:

$$DX3 \geq 0.5 \text{ mm.}\qquad\text{[Conditional expression 3]}$$

In the example shown in FIG. 1, a point X3 is a point at the effective diameter edge of the object-side surface of the second lens L2, a point XH3 indicates an intersection point between the optical axis Z and the perpendicular line that drops from the point X3 to the optical axis Z, and a point C3 is a central point.

When the object-side surface of the second lens L2 is formed in a shape satisfying Conditional expression 3, it is possible to reduce the angle formed between the light beam incident on the object-side surface and a normal line of the object-side surface and thus prevent the light beam from being refracted at a large angle. Therefore, it is easy to reduce the size of the lens system in the diametric direction.

In order to reduce the size of the lens system in the diametric direction, it is more preferable that the second lens L2 satisfy the following Conditional expression 3-2:

$$DX3 \geq 1.0 \text{ mm.}\qquad\text{[Conditional expression 3-2]}$$

In order to further reduce the size of the lens system in the diametric direction, it is more preferable that the second lens L2 satisfy the following Conditional expression 3-3:

$$DX3 \geq 1.2 \text{ mm.}\qquad\text{[Conditional expression 3-3]}$$

In order to further reduce the size of the lens system in the diametric direction, it is most preferable that the second lens L2 satisfy the following Conditional expression 3-4:

$$DX3 \geq 1.3 \text{ mm.}\qquad\text{[Conditional expression 3-4]}$$

When the focal length of the entire system is f and the curvature radius of the object-side surface of the second lens L2 at the effective diameter edge is RX3, it is preferable that the imaging lens satisfy the following Conditional expression 4:

$$2.5<|RX3|/f.\qquad\text{[Conditional expression 4]}$$

The curvature radius RX3 will be described below.

If the ratio is less than the lower limit of Conditional expression 4, the curvature radius RX3 of the object-side surface of the second lens L2 at the effective diameter edge is too small, and the angle formed between the light beam and the normal line of the object-side surface at the effective diameter edge increases. Therefore, the light beam is refracted at a large angle by the object-side surface, and it is difficult to reduce the size of the lens system in the diametric direction and effectively correct field curvature.

It is preferable that the imaging lens satisfy the following Conditional expression 4-2:

$$4.0<|RX3|/f.\qquad\text{[Conditional expression 4-2]}$$

When the lower limit of Conditional expression 4-2 is satisfied, it is possible to further improve the effects obtained when the upper limit of Conditional expression 4 is satisfied.

In addition, it is preferable that the imaging lens satisfy the following Conditional expression 4-3:

$$6.0<|RX3|/f<100.0.\qquad\text{[Conditional expression 4-3]}$$

If the ratio is more than the upper limit Conditional expression 4-3, it is difficult to obtain a wide angle of view. In order to obtain a wide angle of view, the first lens L1 needs to refract the light beam at a large angle. Therefore, it is difficult to correct distortion and a peripheral image is reduced and formed. As a result, even though an image captured by the imaging device is enlarged by image processing, the resolution of the image is reduced, and it is difficult to prevent the deterioration of image quality. When the lower limit of Conditional expression 4-3 is satisfied, it is possible to further improve the effects obtained when Conditional expression 4-2 is satisfied.

It is more preferable that the imaging lens satisfy the following Conditional expression 4-4:

$$6.0<|RX3|/f<50.0.\qquad\text{[Conditional expression 4-4]}$$

When the upper limit of Conditional expression 4-4 is satisfied, it is possible to further improve the effects obtained when the upper limit of Conditional expression 4-3 is satisfied.

When the focal length of the entire system is f and the curvature radius of the object-side surface of the second lens L2 at the center is R3, it is preferable that the imaging lens satisfy the following Conditional expression 5:

$$0.7<R3/f<4.0.\qquad\text{[Conditional expression 5]}$$

If the ratio is more than the upper limit of Conditional expression 5, the curvature radius of the object-side surface of the second lens L2 at the center is too large. It is preferable that the power of the object-side surface of the second lens L2 be reduced toward the periphery thereof, which will be described below. Therefore, when the curvature radius of the second lens L2 at the center is too large, the curvature radius of a peripheral portion of the second lens is also too large. Therefore, in particular, the incident angle of the light beam on the surface in the periphery of the second lens is too large, and the light beam is refracted at a large angle by the object-side surface of the second lens L2. As a result, the height of the light beam passing through the first lens L1 increases, and it is difficult to reduce the size of the lens system in the diametric direction. If the ratio is less than the lower limit of Conditional expression 5, the curvature radius of the object-side surface of the second lens L2 at the center is too small, and it is difficult to process the second lens L2.

It is more preferable that the imaging lens satisfy the following Conditional expression 5-2:

$$0.7<R3/f<1.3.\qquad\text{[Conditional expression 5-2]}$$

When the upper limit of Conditional expression 5-2 is satisfied, it is possible to further improve the effects obtained when the upper limit of Conditional expression 5 is satisfied.

It is most preferable that the imaging lens satisfy the following Conditional expression 5-3:

$$0.85 < R3/f < 1.2. \quad \text{[Conditional expression 5-3]}$$

When Conditional expression 5-3 is satisfied, it is possible to further improve the effects obtained when Conditional expression 5-2 is satisfied.

When the focal length of the entire system is f and the distance from the object-side surface of the first lens L1 to the image surface Sim in the optical axis direction is L, it is preferable that the imaging lens satisfy the following Conditional expression 6:

$$7.5 < L/f < 13.0. \quad \text{[Conditional expression 6]}$$

When the distance L is calculated, the back focal length is an air-equivalent length. That is, for example, when a cover glass or a filter is provided between a lens that is arranged closest to the image side and the image plane Sim, the thickness of the cover glass or the filter is an air-equivalent value.

If the ratio is more than the upper limit of Conditional expression 6, the size of the system increases. If the ratio is less than the lower limit of Conditional expression 6, it is difficult to obtain a sufficiently wide angle of view. When a wide angle of view is obtained, the angle of view is increased by distortion, which results in an increase in the distortion of an image in the periphery of an imaging area, or the total length of the lens system is reduced, which results in a reduction in the size of each lens. As a result, it is difficult to manufacture the imaging lens, or the manufacturing costs of the imaging lens increase.

It is more preferable that the imaging lens satisfy the following Conditional expression 6-2:

$$7.5 < L/f < 11.0. \quad \text{[Conditional expression 6-2]}$$

When the upper limit of Conditional expression 6-2 is satisfied, it is possible to further improve the effects obtained when the upper limit of Conditional expression 6 is satisfied.

It is most preferable that the imaging lens satisfy the following Conditional expression 6-3:

$$8.0 < L/f < 10.0. \quad \text{[Conditional expression 6-3]}$$

When Conditional expression 6-3 is satisfied, it is possible to further improve the effects obtained when Conditional expression 6-2 is satisfied.

When the focal length of the entire system is f and the focal length of the first lens L1 is f1, it is preferable that the imaging lens satisfy the following Conditional expression 7:

$$-8.0 < f1/f < -3.0. \quad \text{[Conditional expression 7]}$$

If the ratio is more than the upper limit of Conditional expression 7, the power of the first lens L1 becomes strong and it is easy to obtain a wide angle of view. However, it is difficult to correct distortion since marginal rays are refracted at a large angle by the object-side surface, or the light beam height of the object-side surface increases since the light beam is refracted at a large angle by the image-side surface, which results in an increase in the size of the lens system in the diametric direction. If the ratio is less than Conditional expression 7, the power of the first lens L1 is too weak and it is difficult to obtain a wide angle of view. Therefore, a sufficient angle of view is not obtained.

It is more preferable that the imaging lens satisfy the following Conditional expression 7-2:

$$-7.0 < f1/f < -3.5. \quad \text{[Conditional expression 7-2]}$$

When Conditional expression 7-2 is satisfied, it is possible to further improve the effects obtained when Conditional expression 7 is satisfied.

It is more preferable that the imaging lens satisfy the following Conditional expression 7-3:

$$-6.3 < f1/f < -4.0. \quad \text{[Conditional expression 7-3]}$$

When Conditional expression 7-3 is satisfied, it is possible to further improve the effects obtained when Conditional expression 7-2 is satisfied.

When the focal length of the entire system is f and an air space between the first lens L1 and the second lens L2 on the optical axis is D2, it is more preferable that the imaging lens satisfy the following Conditional expression 8:

$$0.3 < D2/f < 2.0. \quad \text{[Conditional expression 8]}$$

If the ratio is more than the upper limit of Conditional expression 8, the gap between the first lens L1 and the second lens L2 increases, which results in an increase in the diameter of the first lens L1, or the power of the first lens is too strong in order to reduce the size in the diametric direction, which makes it difficult to correct distortion. If the ratio is less than the lower limit of Conditional expression 8, the distance between the first lens L1 and the second lens L2 is too small, and the on-axis light beams and the marginal rays are insufficiently separated from each other. As a result, it is difficult to correct field curvature.

It is more preferable that the imaging lens satisfy the following Conditional expression 8-2:

$$0.3 < D2/f < 0.6. \quad \text{[Conditional expression 8-2]}$$

When the upper limit of Conditional expression 8-2 is satisfied, it is possible to further improve the effects obtained when the upper limit of Conditional expression 8 is satisfied.

It is most preferable that the imaging lens satisfy the following Conditional expression 8-3:

$$0.35 < D2/f < 0.45. \quad \text{[Conditional expression 8-3]}$$

When Conditional expression 8-3 is satisfied, it is possible to further improve the effects obtained when Conditional expression 8-2 is satisfied.

When the focal length of the entire system is f and a composite focal length of the first lens L1 and the second lens L2 is f12, it is preferable that the imaging lens satisfy the following Conditional expression 9:

$$-3.5 < f12/f < -0.7. \quad \text{[Conditional expression 9]}$$

If the ratio is more than the upper limit of Conditional expression 9, it is possible to easily obtain a wide angle of view, but field curvature increases. Therefore, it is difficult to obtain a high-quality image. If the ratio is less than the lower limit of Conditional expression 9, the power of two negative lenses that are arranged closest to the object side becomes weak. Therefore, it is difficult to refract the light beams at a large angle and thus obtain a wide angle of view, or the size of the lens system increases in order to obtain a wide angle of view.

It is more preferable that the imaging lens satisfy the following Conditional expression 9-2:

$$-3.0 < f12/f < -0.7. \quad \text{[Conditional expression 9-2]}$$

When the lower limit of Conditional expression 9-2 is satisfied, it is easy to reduce the size of the lens system while obtaining a wide angle of view.

It is more preferable that the imaging lens satisfy the following Conditional expression 9-3:

$$-2.4 < f12/f < -0.7. \quad \text{[Conditional expression 9-3]}$$

When the lower limit of Conditional expression 9-3 is satisfied, it is easy to reduce the size of the lens system while obtaining a wide angle of view.

When the focal length of the entire system is f and the curvature radius of the object-side surface of the first lens L1 is R1, it is preferable that the imaging lens satisfy the following Conditional expression 10:

$15<R1/f<30.$  [Conditional expression 10]

If the ratio is more than the upper limit of Conditional expression 10, the curvature radius of the object-side surface of the first lens L1 is too large, and it is possible to easily reduce the size of the lens in the diametric direction. However, the light beam is refracted at a wide angle and distortion increases. In addition, the image in the periphery of the imaging area is reduced and formed. Therefore, even though the image captured by the imaging device is enlarged by image processing, the resolution of the image is reduced, and it is difficult to prevent the deterioration of image quality. If the ratio is less than the lower limit of Conditional expression 10, the curvature radius of the object-side surface of the first lens L1 is too small and the image-side surface of the first lens L1 or the second lens L2 needs to refract the light beam at a large angle in order to obtain a wide angle of view. As a result, the light beam height of the object-side surface of the first lens L1 increases, which makes it difficult to reduce the size of the lens. In addition, the curvature radius of the image-side surface of the first lens L1 needs to be reduced in order to refract the light beam at a large angle with the image-side surface of the first lens L1. In this case, it is difficult to process the first lens or the manufacturing costs of the lens increase.

It is preferable that the imaging lens satisfy the following Conditional expression 10-2:

$18<R1/f<25.$  [Conditional expression 10-2]

When Conditional expression 10-2 is satisfied, it is possible to further improve the effects obtained when Conditional expression 10 is satisfied.

It is preferable that the imaging lens satisfy the following Conditional expression 10-3:

$19.5<R1/f<24.0.$  [Conditional expression 10-3]

When Conditional expression 10-3 is satisfied, it is possible to further improve the effects obtained when Conditional expression 10-2 is satisfied.

When the focal length of the entire system is f and the air space between the second lens L2 and the third lens L3 on the optical axis is D4, it is preferable that the imaging lens satisfy the following Conditional expression 11:

$0.8<D4/f<1.8.$  [Conditional expression 11]

If the ratio is more than the upper limit of Conditional expression 11, the length of the lens system in the optical axis direction increases, and the outside diameter of the first lens L1 also increases, which results in an increase in the size of the entire system. If the ratio is less than the lower limit of Conditional expression 11, the gap between the second lens L2 and the third lens L3 is reduced. When the gap between the second lens L2 and the third lens L3 is reduced, the aspheric shape of the image-side surface of the second lens L2 is restricted, and it is difficult to correct field curvature and distortion.

It is preferable that the imaging lens satisfy the following Conditional expression 11-2:

$0.9<D4/f<1.4.$  [Conditional expression 11-2]

When Conditional expression 11-2 is satisfied, it is possible to further improve the effects obtained when Conditional expression 11 is satisfied.

When the focal length of the entire system is f and the thickness of the center of the second lens L2 is D3, it is preferable that the imaging lens satisfy the following Conditional expression 12:

$0.7<D3/f<1.3.$  [Conditional expression 12]

If the ratio is more than the upper limit of Conditional expression 12, the thickness of the second lens L2 is too large and the size of the lens system increases. If the ratio is less than the lower limit of Conditional expression 12, the thickness of the center of the second lens L2 is too small, and it is easy to reduce the size of the lens. However, in this case, since the thickness ratio of a peripheral portion (the ratio of the thickness of the peripheral portion of the lens to the thickness of the center of the lens in the optical axis direction) increases, it is difficult to mold the lens.

It is preferable that the imaging lens satisfy the following Conditional expression 12-2:

$0.9<D3/f<1.2.$  [Conditional expression 12-2]

When Conditional expression 12-2 is satisfied, it is possible to further improve the effects obtained when Conditional expression 12 is satisfied.

When the curvature radius of the object-side surface of the second lens L2 at the center is R3 and the curvature radius of the image-side surface of the second lens L2 at the center R4, it is preferable that the imaging lens satisfy the following Conditional expression 13:

$0.1<(R3-R4)/(R3+R4)<0.55.$  [Conditional expression 13]

If the ratio is more than the upper limit of Conditional expression 13, the difference between the curvature radii of the object-side surface and the image-side surface of the second lens L2 increases, and the light beam is refracted at a large angle by the second lens L2. Therefore, it is difficult to reduce the size of the lens in the diametric direction. If the ratio is less than the lower limit of Conditional expression 13, the difference between the curvature radii of the object-side surface and the image-side surface of the second lens L2 is too small, and the power of the second lens L2 is too weak. Therefore, it is difficult to obtain a wide angle of view.

It is preferable that the imaging lens satisfy the following Conditional expression 13-2:

$0.1<(R3-R4)/(R3+R4)<0.5.$  [Conditional expression 13-2]

When the upper limit of Conditional expression 13-2 is satisfied, it is possible to further improve the effects obtained when the upper limit of Conditional expression 13 is satisfied.

It is more preferable that the imaging lens satisfy the following Conditional expression 13-3:

$0.2<(R3-R4)/(R3+R4)<0.42.$  [Conditional expression 13-3]

When Conditional expression 13-3 is satisfied, it is possible to further improve the effects obtained when Conditional expression 13-2 is satisfied.

When the focal length of the entire system is f and the thickness of the center of the first lens L1 is D1, it is preferable that the imaging lens satisfy the following Conditional expression 14:

$0.7<D1/f<1.8.$  [Conditional expression 14]

If the ratio is more than the upper limit of Conditional expression 14, the thickness of the first lens L1 is too large, and it is difficult to reduce the size of the lens system in the optical axis direction and the diametric direction. If the ratio is less than the lower limit of Conditional expression 14, the thickness of the first lens L1 is too small, and it is easy to reduce the size of the lens. However, the resistance of the lens to various kinds of impact is reduced. For example, when the imaging lens is used for an in-vehicle camera or a monitoring camera, the imaging lens needs to be resistant to various kinds of impact since the first lens L1 is exposed to the outside. Therefore, it is not preferable the thickness of the first lens L1 be too small.

It is preferable that the imaging lens satisfy the following Conditional expression 14-2:

$$0.8 < D1/f < 1.3. \qquad \text{[Conditional expression 14-2]}$$

When Conditional expression 14-2 is satisfied, it is possible to further improve the effects obtained when Conditional expression 14 is satisfied.

When the focal length of the entire system is f and the distance from the image-side surface of the lens closest to the image side (the fourth lens L4 in the example shown in FIG. 1) to the image plane Sim on the optical axis is Bf, it is preferable that Bf/f be in the range of 1.0 to 2.4. When 1.0<Bf/f<2.4 is satisfied, it is easy to ensure a sufficient back focal length while preventing an increase in the size of the lens system. It is more preferable that 2<Bf/f<2.4 be satisfied. Bf is an air-equivalent length. That is, when a cover glass or a filter is provided between a lens that is arranged closest to the image side and the image plane Sim, the thickness of the cover glass or the filter is an air-equivalent value.

It is preferable that the object-side surface of the second lens L2 be an aspheric surface. It is preferable that the object-side surface of the second lens L2 have a shape in which the object-side surface has a positive power at the center and the positive power at the effective diameter edge is lower than that at the center. When the object-side surface of the second lens L2 has the above-mentioned shape, it is possible to reduce the angle formed between the light beam and the normal line of the object-side surface at the effective diameter edge, and the object-side surface can focus the light beam without refracting the light beam at a large angle. In addition, it is easy to reduce the size of the lens system in the diametric direction, and it is possible to effectively correct field curvature and distortion.

Figure 2:
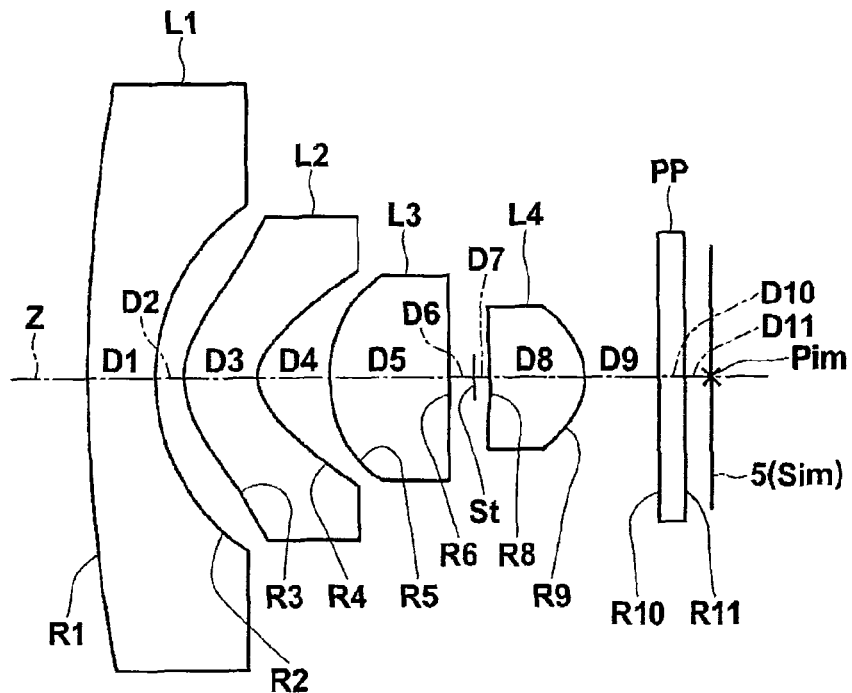
FIG. 2 is a cross-sectional view illustrating the structure of an imaging lens according to Example 1 of the invention.
Figure 3:
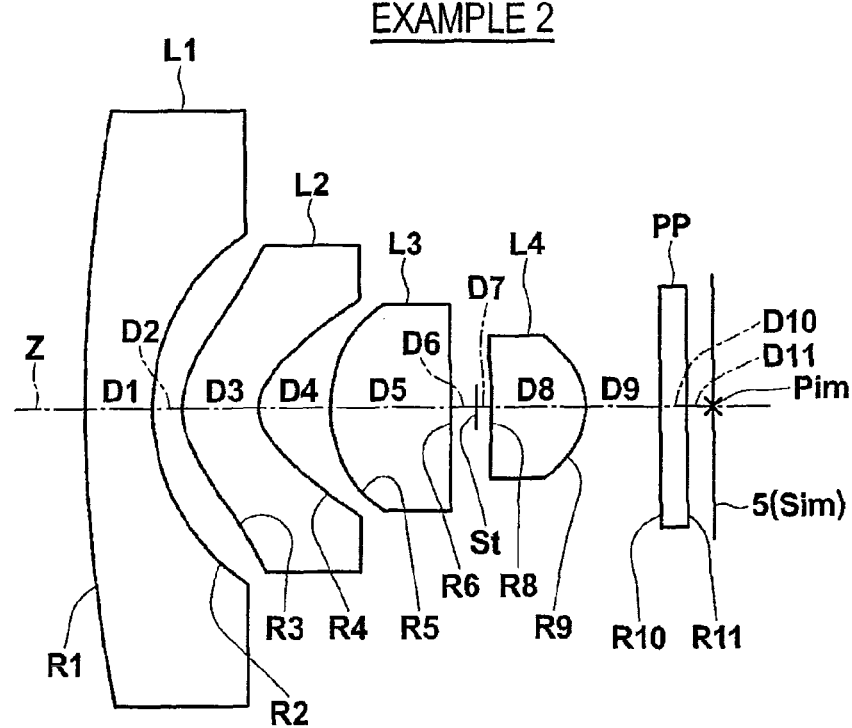
FIG. 3 is a cross-sectional view illustrating the structure of an imaging lens according to Example 2 of the invention.
Figure 4:
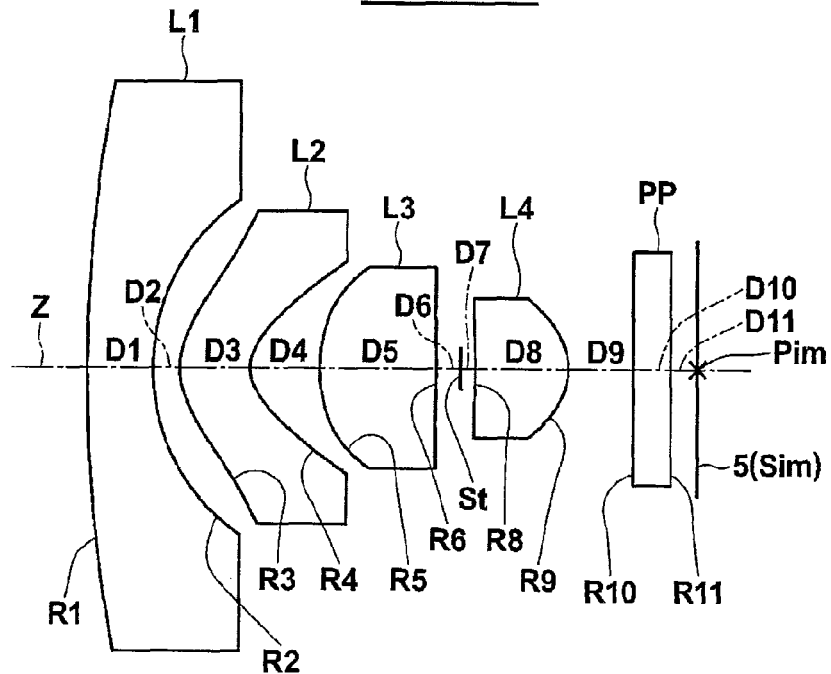
FIG. 4 is a cross-sectional view illustrating the structure of an imaging lens according to Example 3 of the invention.
Figure 5:
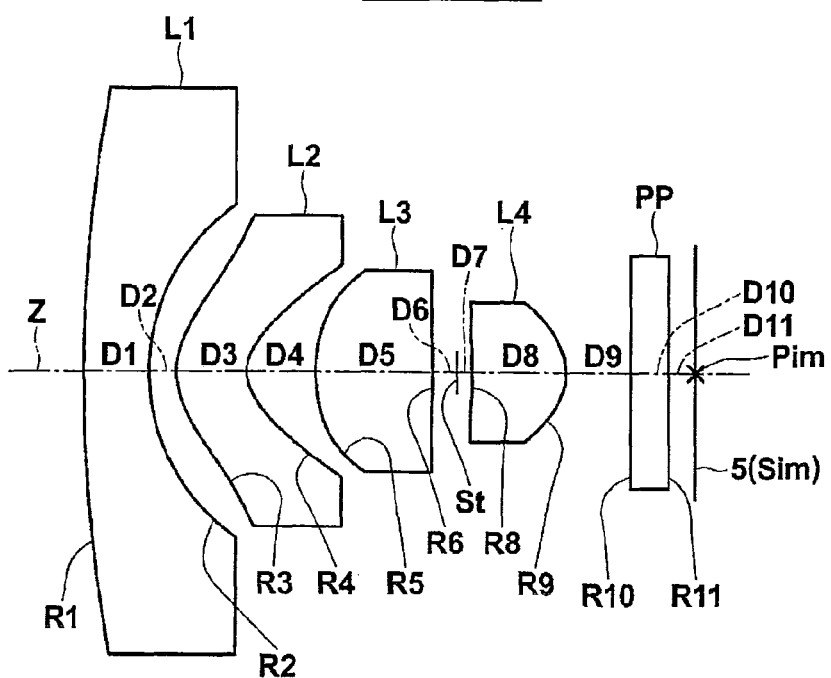
FIG. 5 is a cross-sectional view illustrating the structure of an imaging lens according to Example 4 of the invention.
Figure 6:
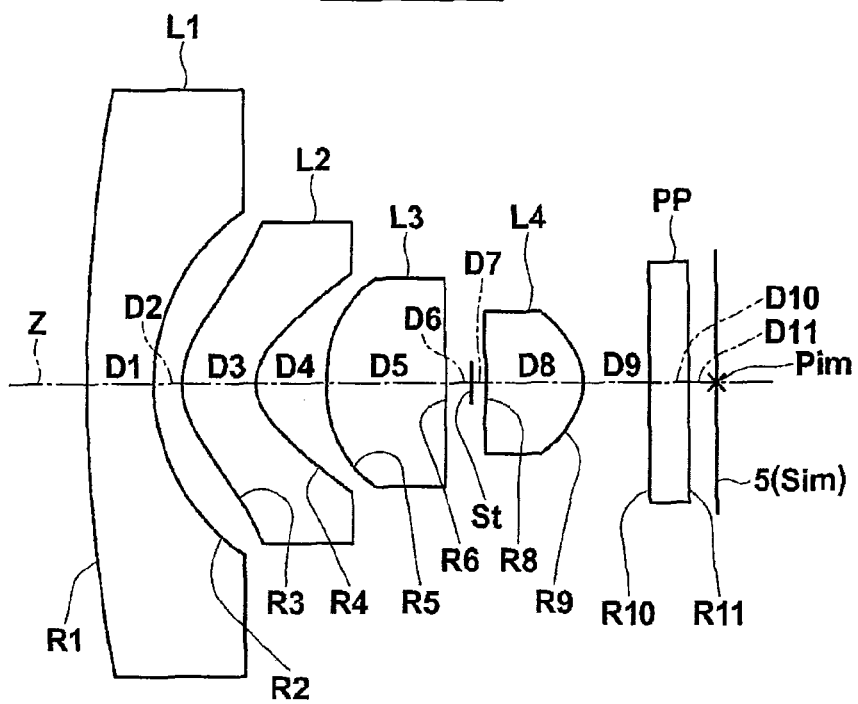
FIG. 6 is a cross-sectional view illustrating the structure of an imaging lens according to Example 5 of the invention.
Figure 7:
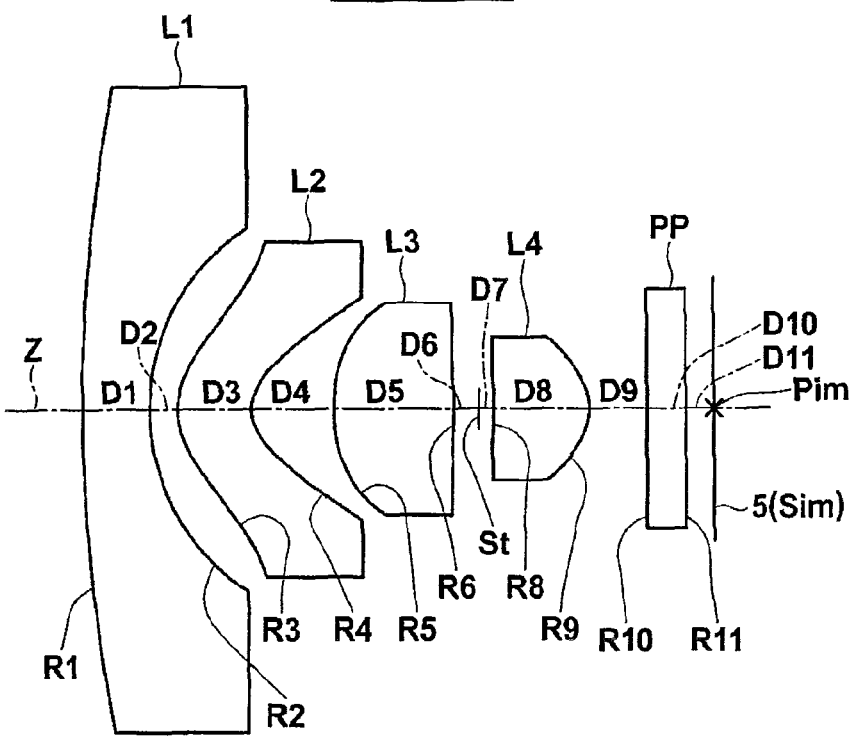
FIG. 7 is a cross-sectional view illustrating the structure of an imaging lens according to Example 6 of the invention.
Figure 8:
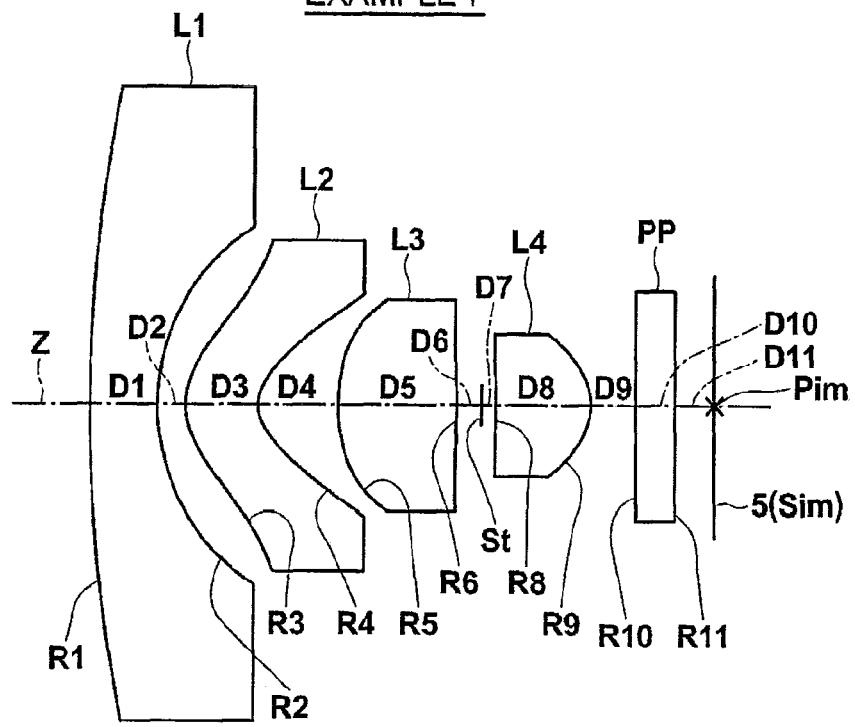
FIG. 8 is a cross-sectional view illustrating the structure of an imaging lens according to Example 7 of the invention.
Figure 9:
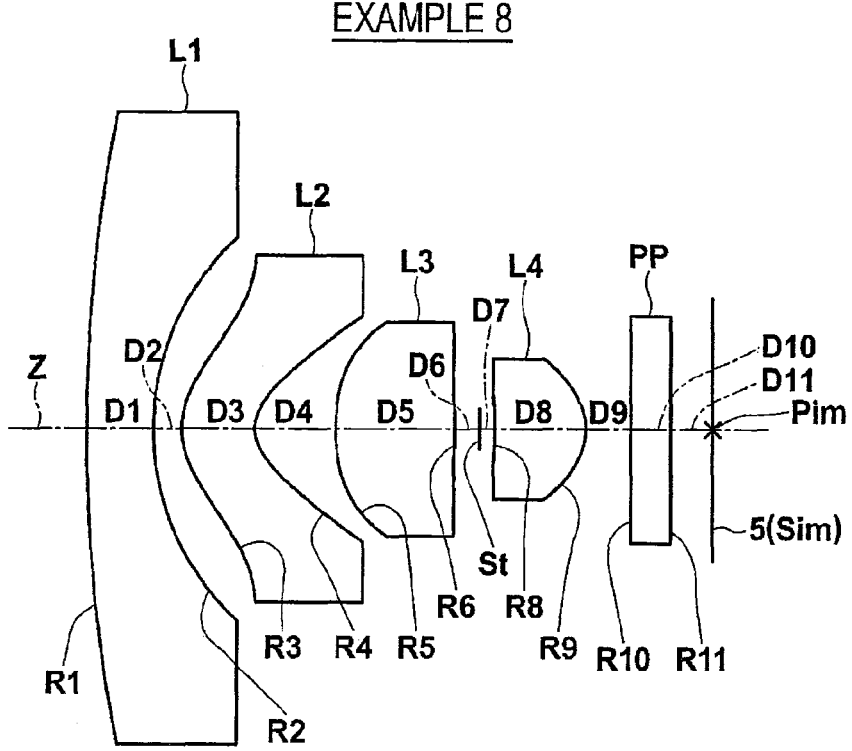
FIG. 9 is a cross-sectional view illustrating the structure of an imaging lens according to Example 8 of the invention.
Figure 10:
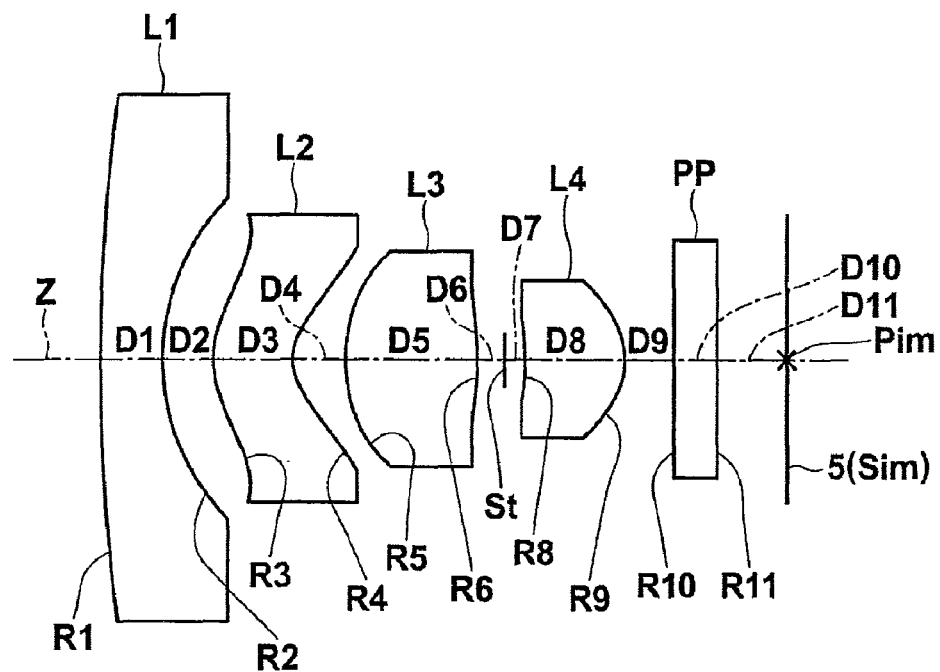
FIG. 10 is a cross-sectional view illustrating the structure of an imaging lens according to Example 9 of the invention.
Figure 11:
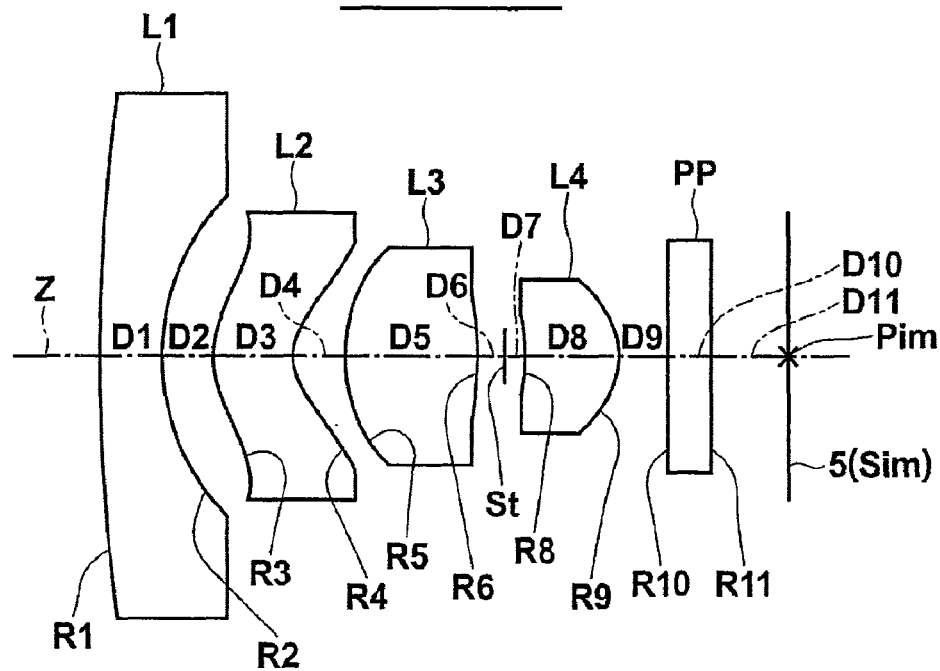
FIG. 11 is a cross-sectional view illustrating the structure of an imaging lens according to Example 10 of the invention.
Figure 12:
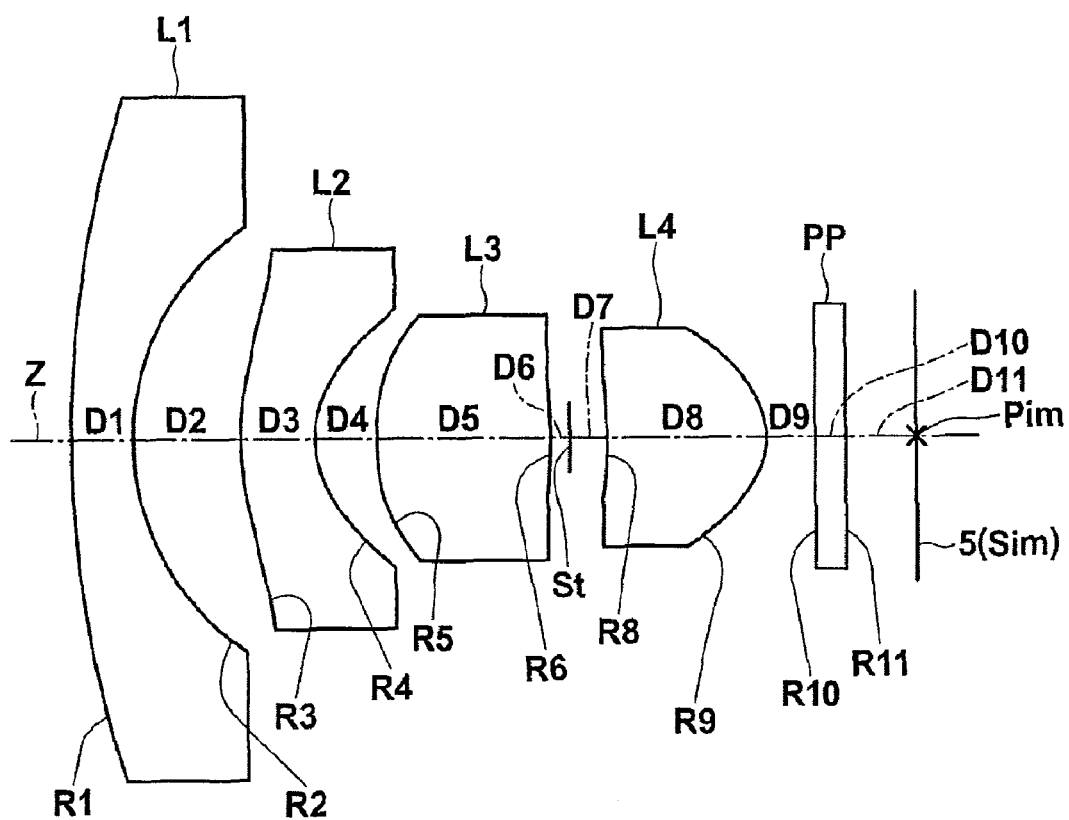
FIG. 12 is a cross-sectional view illustrating the structure of an imaging lens according to Example 11 of the invention.
Figures 14A, 14B, 14C, 14D:
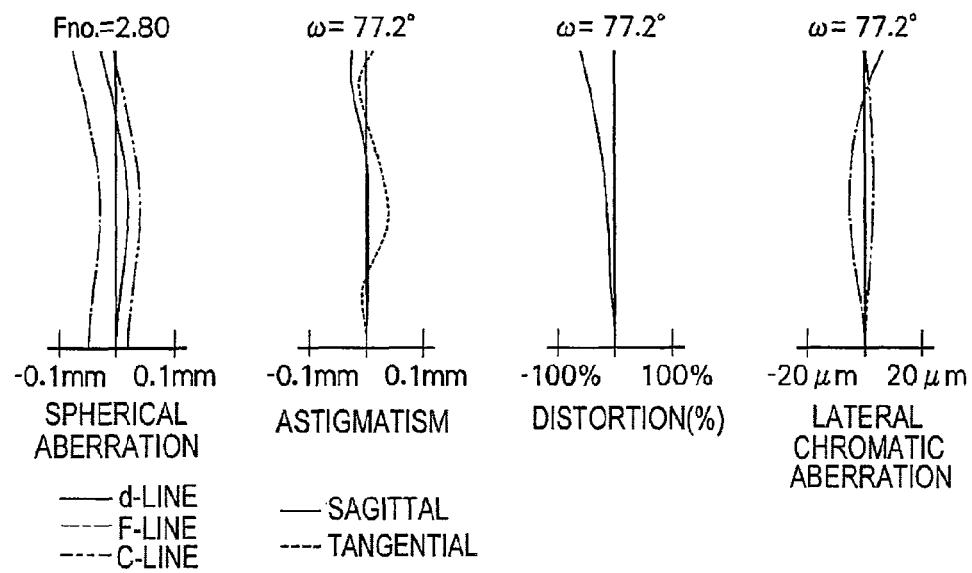
FIGS. 14A to 14I are diagrams illustrating aberrations of the imaging lens according to Example 2 of the invention.
Figures 14E, 14H:
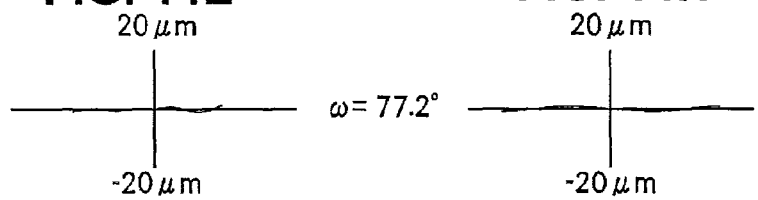
Figures 14F, 14I:
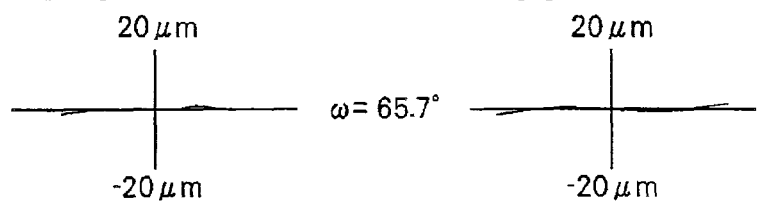
Figure 14G:
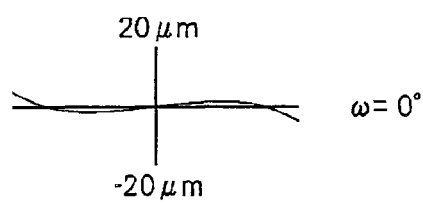
Figures 15A, 15B, 15C, 15D:
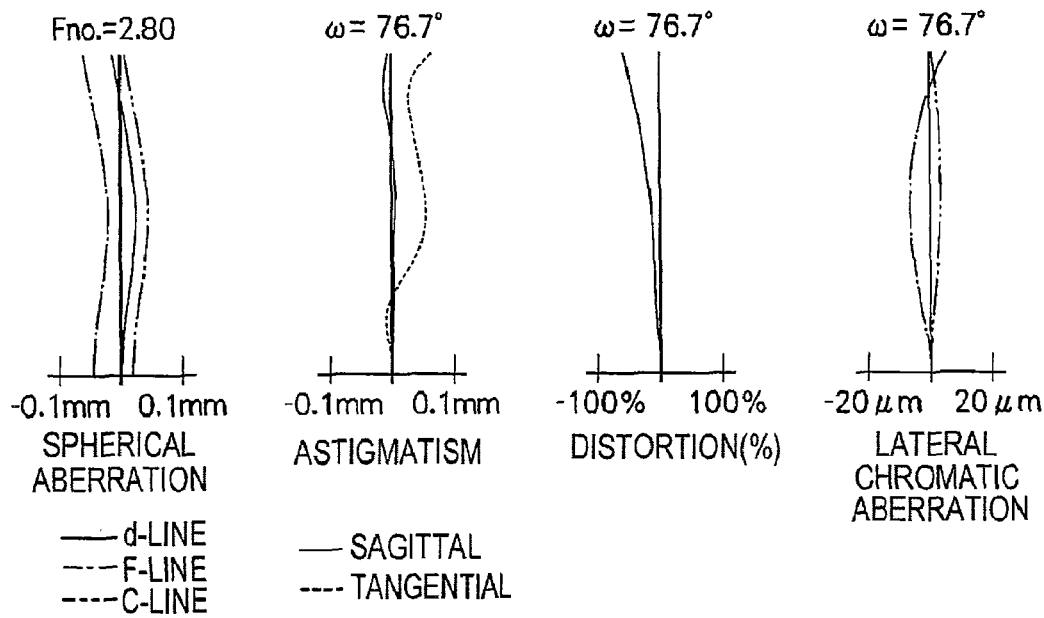
FIGS. 15A to 15I are diagrams illustrating aberrations of the imaging lens according to Example 3 of the invention.
Figure 15E:
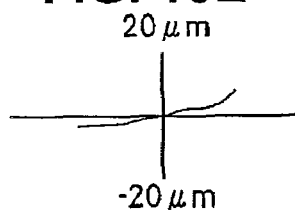
Figure 15H:
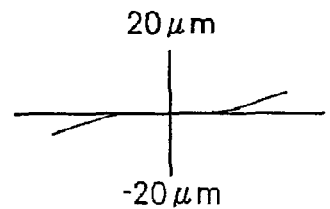
Figure 15F:
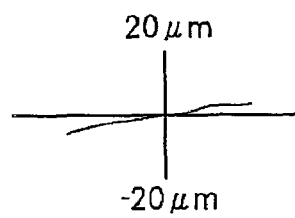
Figure 15I:
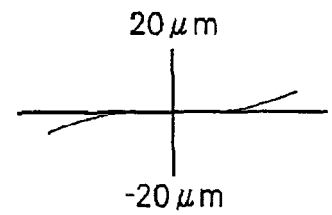
Figure 15G:
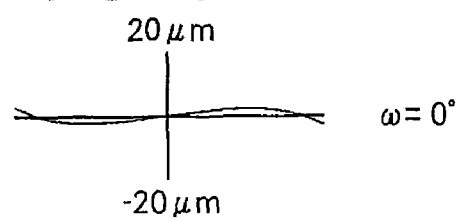
Figures 17A, 17B, 17C, 17D:
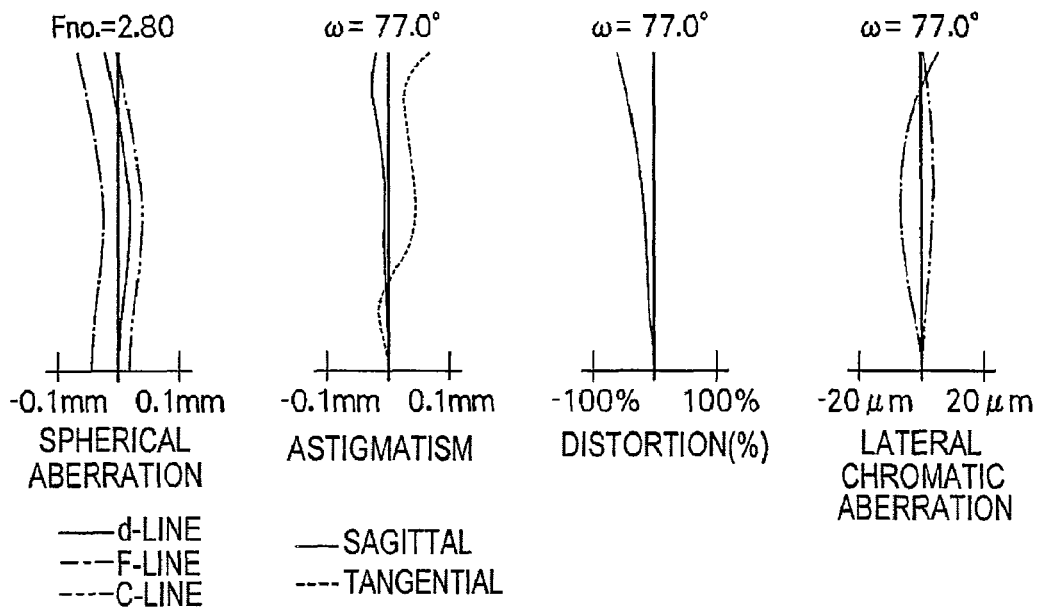
FIGS. 17A to 17I are diagrams illustrating aberrations of the imaging lens according to Example 5 of the invention.
Figure 17E:
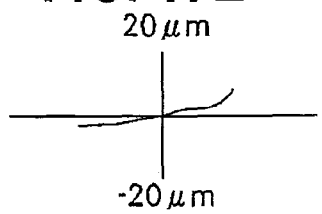
Figure 17H:
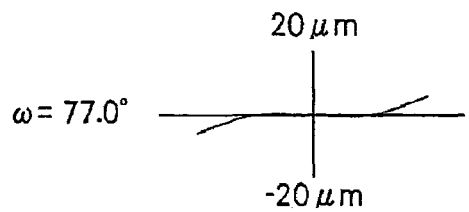
Figure 17F:
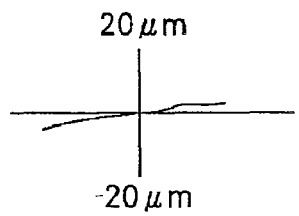
Figure 17I:
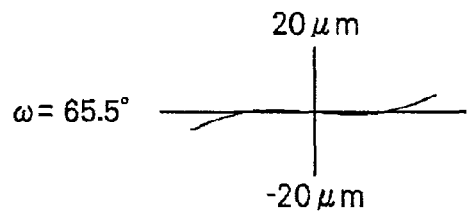
Figure 17G:
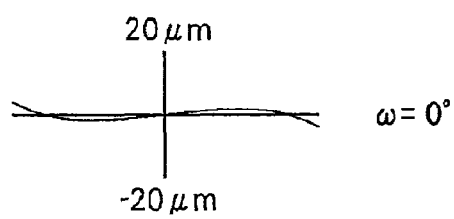
Figures 20A, 20B, 20C, 20D:
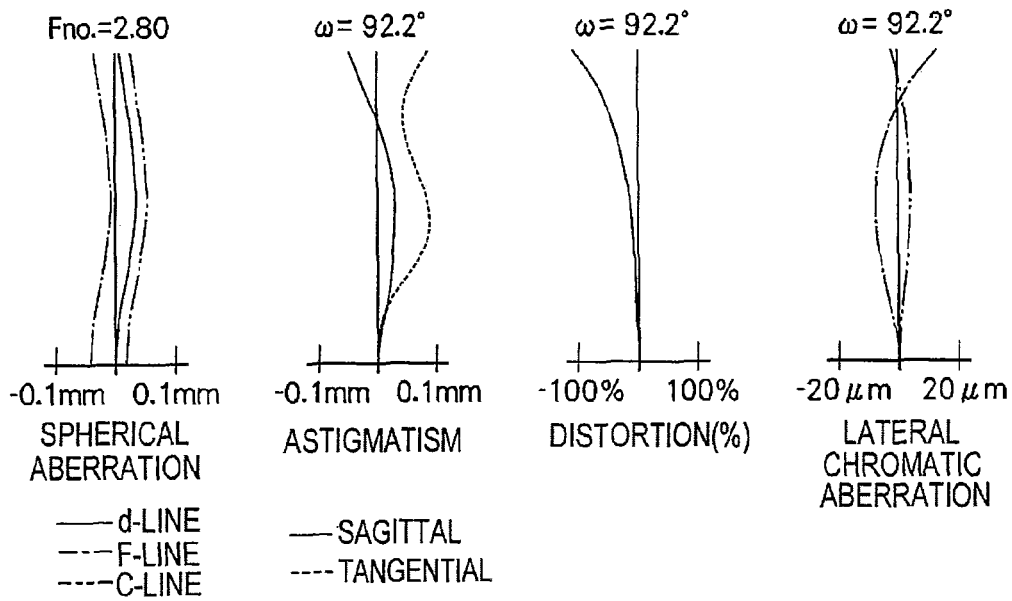
FIGS. 20A to 20I are diagrams illustrating aberrations of the imaging lens according to Example 8 of the invention.
Figures 20E, 20H:
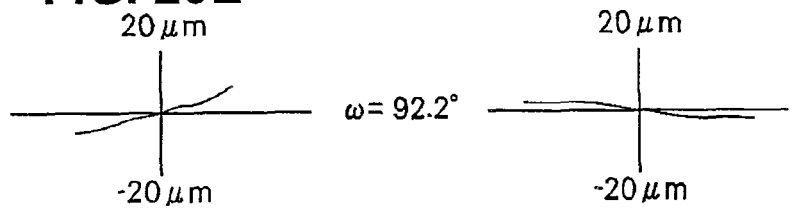
Figures 20F, 20I:
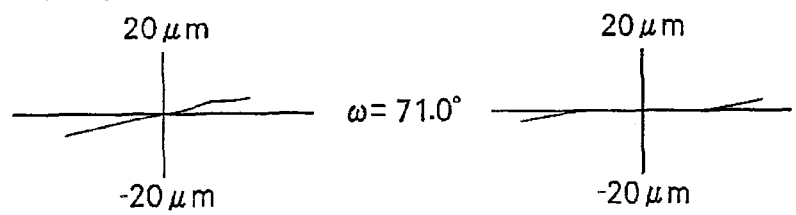
Figure 20G:
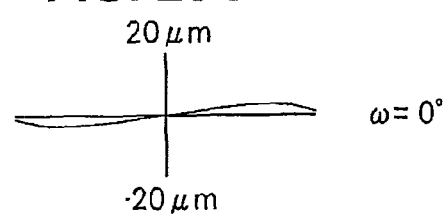
Figures 21A, 21B, 21C, 21D:
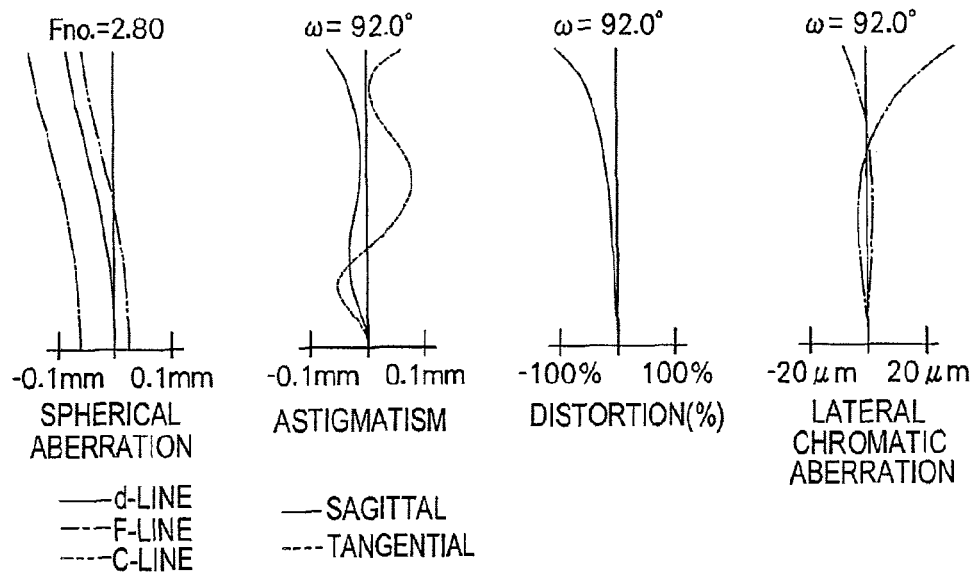
FIGS. 21A to 21I are diagrams illustrating aberrations of the imaging lens according to Example 9 of the invention.
Figure 21E:
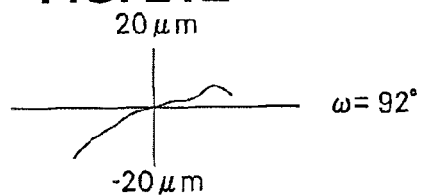
Figure 21H:
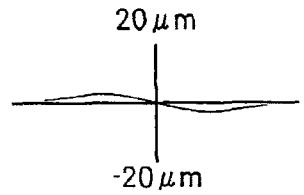
Figure 21F:
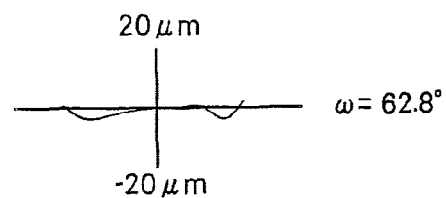
Figure 21I:
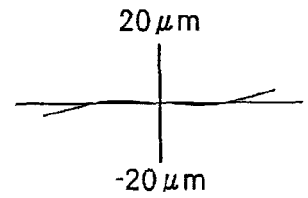
Figure 21G:
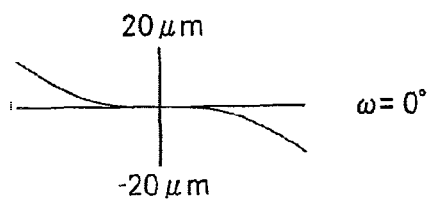
Figures 22A, 22B, 22C, 22D:
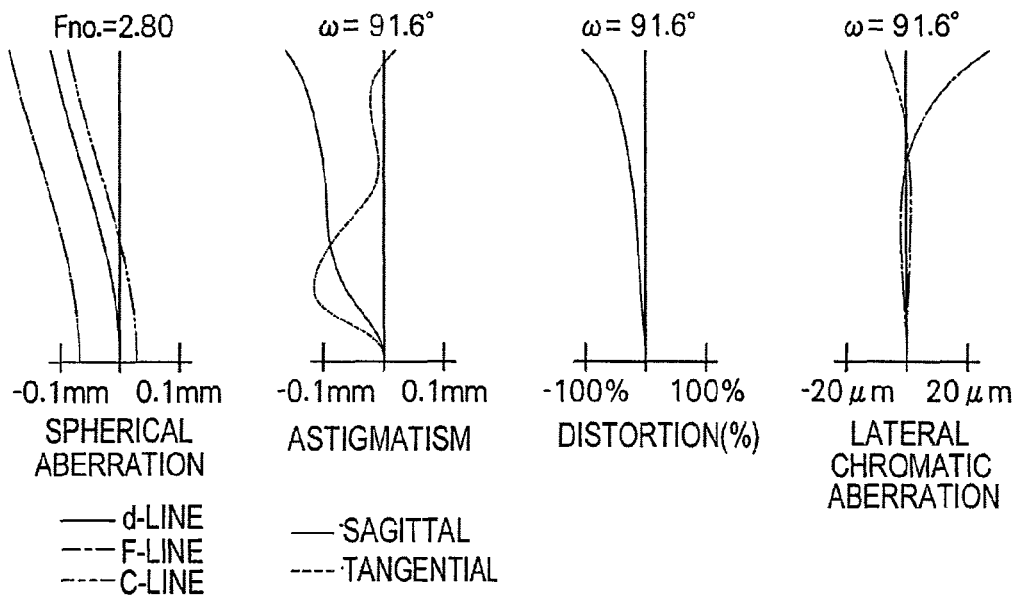
FIGS. 22A to 22I are diagrams illustrating aberrations of the imaging lens according to Example 10 of the invention.
Figure 22E:
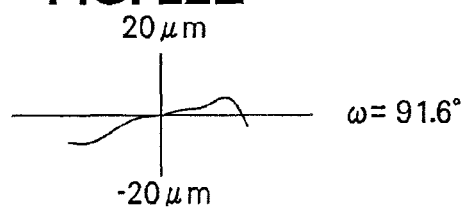
Figure 22H:
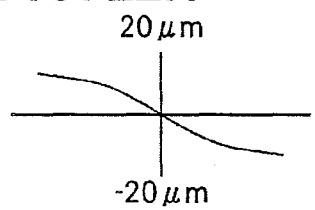
Figure 22F:
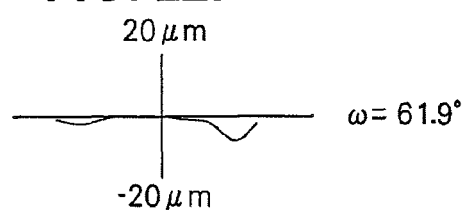
Figure 22I:
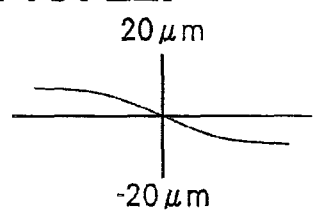
Figure 22G:
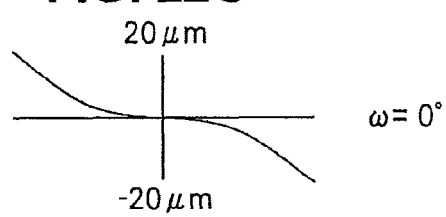
Figure 24:
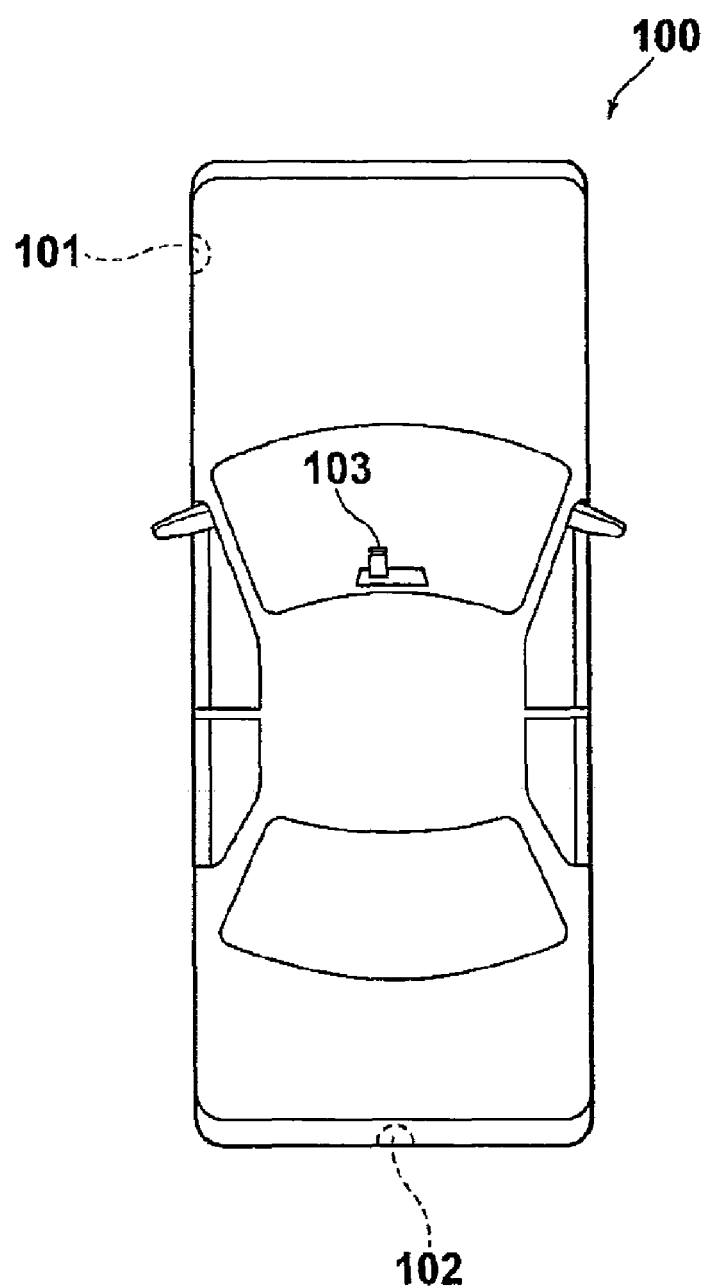
FIG. 24 is a diagram illustrating the arrangement of in-vehicle imaging apparatuses according to an embodiment of the invention.

Next, the shape of the object-side surface of the second lens L2 will be described with reference to FIG. 1. In FIG. 1, the point C3 is the center of the object-side surface of the second lens L2 and is also an intersection point between the optical axis Z and the object-side surface of the second lens L2. In FIG. 2, the point X3 is at the effective diameter edge of the object-side surface of the second lens L2 and is an intersection point between the outermost light beam 6 included in the off-axis light beams 4 and the object-side surface of the second lens L2.

In this case, as shown in FIG. 1, an intersection point between the optical axis Z and the normal line of the lens surface at the point X3 is defined as a point P3, a segment X3-P3 linking the point X3 and the point P3 is defined as a curvature radius RX3 at the point X3, and the length |X3-P3| of the segment X3-P3 is defined as the absolute value |RX3| of the curvature radius RX3. That is, |X3-P3| is equal to |RX3|. In addition, the curvature radius at the point C3, that is, the curvature radius of the object-side surface of the second lens L2 at the center is defined as R3 and the absolute value of the curvature radius is defined as |R3| (not shown in FIG. 1).

The object-side surface of the second lens L2 'having a positive power at the center' means that a paraxial region including the point C3 in the object-side surface has a convex shape. The shape of the object-side surface of the second lens L2 in which 'the positive power at the effective diameter edge is lower than that at the center' means a shape in which the point P3 is closer to the image side than the point C3 and the absolute value |RX3| of the curvature radius at the point X3 is more than the absolute value |R3| of the curvature radius at the point C3.

In FIG. 1, for ease of understanding, a circle CC3 that passes through the point C3 in the radius |R3| and has its center on the optical axis is represented by a dotted line, and a circle CX3 that passes through the point X3 in the radius |RX3| and has its center on the optical axis is represented by a two-dot chain line. The circle CX3 is larger than the circle CC3 and |R3|<|RX3| is established.

It is preferable that the absolute value |RX3| of the curvature radius at the point X3 be three times or more than the absolute value |R3| of the curvature radius at the point C3. In this case, it is easy to reduce the size of the lens system in the diametric direction. It is more preferable that the absolute value |RX3| be four times or more than the absolute value |R3|. In this case, it is easier to reduce the size of the lens system in the diametric direction.

It is preferable that the image-side surface of the second lens L2 be an aspheric surface. It is preferable that the image-side surface of the second lens L2 have a shape in which the image-side surface has a negative power at the center and the negative power at the effective diameter edge is lower than that at the center. When the image-side surface of the second lens L2 has the above-mentioned shape, it is possible to transmit light to the third lens L3, without refracting marginal rays at a large angle, and focus the light with the subsequent lens. Therefore, it is easy to effectively correct distortion. In addition, since the image-side surface of the second lens L2 does not refract the marginal rays at a large angle, it is possible to reduce the size of the lens system in the diametric direction.

The shape of the image-side surface of the second lens L2 is the same as that of the object-side surface of the second lens L2 which has been described with reference to FIG. 1, and can be considered as follows. In a cross-sectional view of the lens, when the effective diameter edge of the image-side surface of the second lens L2 is a point X4 and an intersection point between the optical axis Z and a normal line at the point X4 is a point P4, a segment X4-P4 linking the point X4 and the point P4 is defined as a curvature radius at the point X4, and the length |X4-P4| of the segment linking the point X4 and the point P4 is defined as the absolute value |RX4| of the curvature radius at the point X4. That is, |X4-P4| is equal to |RX4|. In addition, an intersection point between the optical axis Z and the image-side surface of the second lens L2, that is, the center of the image-side surface of the second lens L2 is defined as a point C4. The absolute value of the curvature radius at the point C4 is defined as |R4|.

The shape of the image-side surface of the second lens L2 in which 'the image-side surface has a negative power at the center and the negative power at the effective diameter edge is lower than that at the center' means a shape in which a paraxial region including the point C4 has a concave shape, the point P4 is closer to the image side than the point C4, and the absolute value |RX4| of the curvature radius at the point X4 is more than the absolute value |R4| of the curvature radius at the point C4.

It is preferable that the absolute value |RX4| of the curvature radius at the point X4 and the absolute value |R4| of the curvature radius at the point C4 satisfy the following Conditional expression 15:

$$1.2 < |RX4|/|R4|. \qquad \text{[Conditional expression 15]}$$

If the ratio is less than the lower limit of Conditional expression 15, it is difficult to effectively correct distortion and reduce the size of the lens system in the diametric direction.

It is more preferable that the absolute values satisfy the following Conditional expression 15-2:

$2.0<|RX4|/|R4|$. [Conditional expression 15-2]

When Conditional expression 15-2 is satisfied, it is possible to further improve the effects obtained when Conditional expression 15 is satisfied.

It is most preferable that the absolute values satisfy the following Conditional expression 15-3:

$3.0<|RX4|/|R4|<8.0$. [Conditional expression 15-3]

When the upper limit of Conditional expression 15-3 is satisfied, it is possible to prevent the curvature radius from being too large at the effective diameter edge. In addition, it is easy to obtain a wide angle of view and correct field curvature. If the lower limit of Conditional expression 15-3 is satisfied, it is possible to further improve the effects obtained when Conditional expression 15-2 is satisfied.

It is preferable that the absolute value |RX4| of the curvature radius at the point X4 be 1.5 times or more than the focal length f of the entire system. When the absolute value |RX4| is 1.5 times or more than the focal length f, it is easy to correct distortion and field curvature. It is more preferable that the absolute value |RX4| be 1.8 times or more than the focal length f. In this case, it is easier to correct distortion and field curvature.

It is preferable that the object-side surface of the third lens L3 be an aspheric surface. It is preferable that the object-side surface of the third lens L3 have a shape in which the object-side surface has a positive power at the center and the positive power at the effective diameter edge is higher than that at the center. When the object-side surface of the third lens L3 has the above-mentioned shape, it is possible to effectively correct field curvature and lateral chromatic aberration.

The shape of the object-side surface of the third lens L3 is the same as that of the object-side surface of the second lens L2 which has been described with reference to FIG. 1, and can be considered as follows. In a cross-sectional view of the lens, when the effective diameter edge of the object-side surface of the third lens L3 is a point X5 and an intersection point between the optical axis Z and a normal line at the point X5 is a point P5, a segment X5-P5 linking the point X5 and the point P5 is defined as a curvature radius at the point X5, and the length |X5-P5| of the segment linking the point X5 and the point P5 is defined as the absolute value |RX5| of the curvature radius at the point X5. That is, |X5-P5| is equal to |RX5|. In addition, an intersection point between the optical axis Z and the object-side surface of the third lens L3, that is, the center of the object-side surface of the third lens L3 is defined as a point C5. The absolute value of the curvature radius at the point C5 is defined as |R5|.

The shape of the object-side surface of the third lens L3 in which 'the object-side surface has a positive power at the center and the positive power at the effective diameter edge is higher than that at the center' means a shape in which a paraxial region including the point C5 has a convex shape, the point P5 is closer to the image side than the point C5, and the absolute value |RX5| of the curvature radius at the point X5 is less than the absolute value |R5| of the curvature radius at the point C5.

It is preferable that the absolute value |RX5| of the curvature radius at the point X5 be equal to or less than nine-tenths (0.9) of the absolute value |R5| of the curvature radius at the point C5. In this case, it is possible to correct field curvature and lateral chromatic aberration.

It is preferable that the absolute value |RX5| of the curvature radius at the point X5 be 1.2 times or more than the focal length f of the entire system and be three times or less than the focal length f. When the absolute value |RX5| is 1.2 times or more than the focal length f and is three times or less than the focal length f, it is easy to correct field curvature and lateral chromatic aberration. It is more preferable that the absolute value |RX5| be 1.5 times or more than the focal length f of the entire system and be three times or less than the focal length f. In this case, it is easier to correct field curvature and lateral chromatic aberration.

It is preferable that the image-side surface of the third lens L3 be an aspheric surface. It is preferable that the image-side surface of the third lens L3 have a shape in which the image-side surface has a positive power at the center and the positive power at the effective diameter edge is lower than that at the center. When the image-side surface of the third lens L3 has the above-mentioned shape, it is possible to effectively correct field curvature.

The shape of the image-side surface of the third lens L3 is the same as that of the object-side surface of the second lens L2 which has been described with reference to FIG. 1, and can be considered as follows. In a cross-sectional view of the lens, when the effective diameter edge of the image-side surface of the third lens L3 is a point X6 and an intersection point between the optical axis Z and a normal line at the point X6 is a point P6, a segment X6-P6 linking the point X6 and the point P6 is defined as a curvature radius at the point X6, and the length |X6-P6| of the segment linking the point X6 and the point P6 is defined as the absolute value |RX6| of the curvature radius at the point X6. That is, 1×6-P61 is equal to |RX6|. In addition, an intersection point between the optical axis Z and the image-side surface of the third lens L3, that is, the center of the image-side surface of the third lens L3 is defined as a point C6. The absolute value of the curvature radius at the point C6 is defined as |R6|.

The shape of the image-side surface of the third lens L3 in which 'the image-side surface has a positive power at the center and the positive power at the effective diameter edge is lower than that at the center' means a shape in which a paraxial region including the point C6 has a convex shape, the point P6 is closer to the object side than the point C6, and the absolute value |RX6| of the curvature radius at the point X6 is more than the absolute value |R6| of the curvature radius at the point C6.

It is preferable that the absolute value |RX6| of the curvature radius at the point X6 be two times or more than the absolute value |R6| of the curvature radius at the point C6. In this case, it is possible to effectively correct field curvature. It is more preferable that the absolute value |RX6| be seven times or more than the absolute value |R6|. In this case, it is easier to effectively correct field curvature.

The image-side surface of the third lens L3 may have a shape in which it has a positive power at the center and has a negative power at the effective diameter edge. In this case, it is possible to effectively correct field curvature. The shape of the image-side surface of the third lens L3 in which 'the image-side surface has a positive power at the center and has a negative power at the effective diameter edge' means a shape in which the paraxial region including the point C6 has a convex shape and the effective diameter edge has a concave shape (the point P6 is closer to the image side than the point C6).

It is preferable that the object-side surface of the fourth lens L4 be an aspheric surface. It is preferable that the object-side surface of the fourth lens L4 have a shape in which the object-side surface has a negative power at the center and negative power at the effective diameter edge is higher than that at the center. When the object-side surface of the fourth lens L4 has the above-mentioned shape, it is possible to effectively correct field curvature.

The shape of the object-side surface of the fourth lens L4 is the same as that of the object-side surface of the second lens L2 which has been described with reference to FIG. 1, and can be considered as follows. In a cross-sectional view of the lens, when the effective diameter edge of the object-side surface of the fourth lens L4 is a point X8 and an intersection point between the optical axis Z and a normal line at the point X8 is a point P8, a segment X8-P8 linking the point X8 and the point P8 is defined as a curvature radius at the point X8, and the length |X8-P8| of the segment linking the point X8 and the point P8 is defined as the absolute value |RX8| of the curvature radius at the point X8. That is, 1×8-P81 is equal to |RX8|. In addition, an intersection point between the optical axis Z and the object-side surface of the fourth lens L4, that is, the center of the object-side surface of the fourth lens L4 is defined as a point C8. The absolute value of the curvature radius at the point C8 is defined as |R8|.

The shape of the object-side surface of the fourth lens L4 in which 'the object-side surface has a negative power at the center and the negative power at the effective diameter edge is higher than that at the center' means a shape in which a paraxial region including the point C8 has a concave shape, the point P8 is closer to the object side than the point C8, and the absolute value |RX8| of the curvature radius at the point X8 is less than the absolute value |R8| of the curvature radius at the point C8.

It is preferable that the absolute value |RX8| the curvature radius at the point X8 be equal to or less than nine-tenths of the absolute value |R8| of the curvature radius at the point C8. In this case, it is easy to effectively correct field curvature. It is more preferable that the absolute value |RX8| be equal to or less than half the absolute value |R8|. In this case, it is easier to effectively correct field curvature.

It is preferable that the image-side surface of the fourth lens L4 be an aspheric surface. It is preferable that the image-side surface of the fourth lens L4 have a shape in which the image-side surface has a positive power at the center and the positive power at the effective diameter edge is lower than that at the center. When the image-side surface of the fourth lens L4 has the above-mentioned shape, it is possible to effectively correct spherical aberration and field curvature.

The shape of the image-side surface of the fourth lens L4 can be considered as follows, similar to the shape of the object-side surface of the second lens L2 which has been described with reference to FIG. 1. In a cross-sectional view of the lens, when the effective diameter edge of the image-side surface of the fourth lens L4 is a point X9 and an intersection point between the optical axis Z and a normal line at the point X9 is a point P9, a segment X9-P9 linking the point X9 and the point P9 is defined as a curvature radius at the point X9, and the length |X9-P9| of the segment linking the point X9 and the point P9 is defined as the absolute value |RX9| of the curvature radius at the point X9. That is, |X9-P9| is equal to |RX9|. In addition, an intersection point between the optical axis Z and the image-side surface of the fourth lens L4, that is, the center of the image-side surface of the fourth lens L4 is defined as a point C9. The absolute value of the curvature radius at the point C9 is defined as |R9|.

The shape of the image-side surface of the fourth lens L4 in which 'the image-side surface has a positive power at the center and the positive power at the effective diameter edge is lower than that at the center' means a shape in which a paraxial region including the point C9 has a convex shape, the point P9 is closer to the object side than the point C9, and the absolute value |RX9| of the curvature radius at the point X9 is more than the absolute value |R9| of the curvature radius at the point C9.

It is preferable that the absolute value |RX9| of the curvature radius at the point X9 be 1.3 times or more than the absolute value |R91 of the curvature radius at the point C9. In this case, it is possible to effectively correct spherical aberration and field curvature.

It is preferable that the absolute value |RX9| of the curvature radius at the point X9 be 1.1 times or more than the focal length f of the entire system. When the absolute value |RX9| is 1.1 times or more than the focal length f, it is easy to correct spherical aberration and field curvature.

For the effective diameter or the effective diameter edge, as described in the means for solving the problems, for example, when a rectangular imaging device is arranged on the image surface and an image is formed on the imaging device, the outermost point among the intersection points between the light beams incident on the diagonal edge of the imaging device and the lens surface may be used as the effective diameter edge and the diameter of a circle including the outermost point may be used as the effective diameter.

It is preferable that the effective diameter of the object-side surface of the first lens L1 be equal to or less than 12 mm. When the effective diameter of the object-side surface of the first lens L1 is equal to or less than 12 mm, it is possible to reduce the area exposed to the outside.

When a wide angle of view is required, it is preferable that the total angle of view of the imaging lens be equal to or more than 180°. In this case, it is preferable that the effective diameter of the object-side surface of the first lens L1 be equal to or less than 12 mm while the total angle of view is equal to or more than 180°. For example, when the imaging lens is used as a lens for an in-vehicle camera, the imaging lens needs to be a fish-eye lens with a total angle of view of more than 180° and the size of the lens system in the diametric direction needs to be small such that the outward appearance of the vehicle does not deteriorate. When the total angle of view is equal to or more than 180° and the effective diameter of the object-side surface of the first lens L1 is equal to or less than 12 mm, it is possible to reduce the area exposed to the outside and manufacture a wide-angle lens system. It is more preferable that the total angle of view be equal to or more than 180° and the effective diameter of the object-side surface of the first lens L1 be equal to or less than 11 mm.

When the distance from the object-side surface of the first lens L1 to the image plane Sim on the optical axis is L, it is preferable that the distance L be equal to or less than 13 mm in order to reduce the size of the imaging lens in the optical axis direction. In order to further reduce the size of the imaging lens, it is preferable that the distance L be equal to or less than 12 mm. The back focal length of the distance L is an air-equivalent length.

It is preferable that the first lens L1 be made of a material having an Abbe number of 40 or more with respect to the d-line. In this case, it is possible to effectively correct lateral chromatic aberration while preventing the occurrence of longitudinal chromatic aberration in the practical range.

It is preferable that the second lens L2 be made of a material having an Abbe number of 40 or more with respect to the d-line. In this case, it is possible to effectively correct lateral chromatic aberration while preventing the occurrence of longitudinal chromatic aberration in the practical range.

It is preferable that the third lens L3 be made of a material having an Abbe number of 40 or less with respect to the d-line. In this case, it is possible to effectively correct lateral chromatic aberration while preventing the occurrence of longitudinal chromatic aberration in the practical range.

It is preferable that the third lens L3 be made of a material having an Abbe number of 30 or less with respect to the d-line. In this case, it is possible to more effectively correct lateral chromatic aberration. It is preferable that the third lens L3 be made of a material having an Abbe number of 27 or less with respect to the d-line. In this case, it is possible to more effectively correct lateral chromatic aberration.

It is preferable that the fourth lens L4 be made of a material having an Abbe number of 40 or more with respect to the d-line. In this case, it is possible to effectively correct lateral chromatic aberration while preventing the occurrence of longitudinal chromatic aberration in the practical range.

It is preferable that the third lens L3 have a biconvex shape at least in the paraxial region. When the third lens L3 is a biconvex lens, it is easy to correct lateral chromatic aberration and it is possible to effectively correct field curvature.

It is preferable that the fourth lens L4 have a meniscus shape having a convex surface facing the image side. When the fourth lens L4 has the meniscus shape having the convex surface facing the image side, it is possible to effectively correct spherical aberration and field curvature.

It is preferable that the first lens L1 be made of glass. When the imaging lens is used in a severe environment, such as in an in-vehicle camera or in a monitoring camera, it is preferable that the first lens L1 arranged closest to the object side be made of a material capable of preventing the deterioration of the surface of the lens due to rain and wind and temperature variation due to direct exposure to sunlight, and having high resistance to chemicals, such as oils, fats, and detergent, that is, a material having high water resistance, high weather resistance, high acid resistance, and high chemical resistance. In addition, it is preferable that the first lens L1 be made of a hard and splinterless material. When the first lens L1 is made of glass, it is possible to meet the requirements. The first lens L1 may be made of transparent ceramics.

For example, when the imaging lens is used as a lens for an in-vehicle camera, the first lens L1 needs to have resistance to various kinds of impact. Therefore, it is preferable that the thickness of the center of the first lens L1 be equal to or more than 0.8 mm. If the thickness of the center of the first lens L1 is less than 0.8 mm, the first lens L1 is likely to be cracked. It is preferable that the thickness of the center of the first lens L1 be equal to or more than 1.1 mm in order to improve the strength of the first lens L1.

A protective unit for improving strength, scratch resistance, and chemical resistance may be provided on the object-side surface of the first lens L1. In this case, the first lens L1 may be made of plastic. The protective unit may be formed by hard coating or water-repellent coating.

It is preferable that any one of the second lens L2, the third lens L3, and the fourth lens L4, or any combination thereof be made of plastic. When plastic is used, it is possible to achieve an inexpensive lens system with a light weight and it is easy to accurately form an aspheric shape. Therefore, it is easy to ensure a good optical performance.

When at least one of the second lens L2, the third lens L3, and the fourth lens L4 is made of plastic, the lens may be made of a so-called nanocomposite material obtained by mixing particles with a diameter smaller than the wavelength of light with plastic. The refractive index and the Abbe number of the nanocomposite material vary depending on the kind or the amount of particles to be mixed. When the nanocomposite material is used, it is possible to produce, for example, a material with a high refractive index or a small Abbe number that has not been obtained from the plastic material. Therefore, it is possible to manufacture a lens with a good optical performance.

A filter that cuts blue light from ultraviolet rays or an IR (Infrared) cut filter that cuts infrared light may be provided between the lens system and the imaging device 5 according to the purpose of the imaging lens 1. A material having the same characteristics as the filter may be coated on the lens surface. Alternatively, any lens may be made of a material that absorbs, for example, ultraviolet rays, blue light, or infrared light.

FIG. 1 shows an example in which an optical member PP, which may be various kinds of filters, is provided between the lens system and the image device 5. However, instead of the optical member, various kinds of filters may be provided between the lenses. Alternatively, a material having the same effects as various kinds of filters may be coated on the lens surface of any lens of the imaging lens.

There is a concern that a light beam passing through a portion of each lens other than the effective diameter between the lenses will be incident as stray light on the image surface and serve as a ghost. Therefore, it is preferable to provide a light shielding unit that shields the stray light, if necessary. As the light shielding unit, for example, an opaque pigment may be coated on a portion of the lens other than the effective diameter, or an opaque plate may be provided. Alternatively, an opaque plate may be provided on the optical path of a light beam, serving as stray light, thereby forming a light shielding unit. For example, a hood that shields the stray light may be provided on the object side of the lens that is arranged closest to the object side. For example, in FIG. 1, light shielding units 11 and 12 are provided in portions of the image-side surfaces of the first lens L1 and the second lens L2 other than the effective diameter. The positions of the light shielding units are not limited to the example shown in FIG. 1, but the light shielding units may be provided on other lenses or between the lenses.

A member that shields marginal rays in the practical range of relative illumination, such as an aperture diaphragm, may be provided between the lenses. The marginal ray means a light beam passing through a peripheral portion of an entrance pupil of the optical system among the light beams from the object point deviating from the optical axis Z. As such, when the member that shields the marginal rays is provided, it is possible to improve the image quality of a peripheral portion of the imaging area. In addition, since the member shields light causing a ghost, it is possible to reduce the ghost.

Next, numerical examples of the imaging lens according to the invention will be described. FIGS. 2 to 12 are cross-sectional views illustrating imaging lenses according to Examples 1 to 11. FIGS. 2 to 12 also show an aperture diaphragm St and an optical member PP. In FIGS. 2 to 9, the left side is the object side, and the right side is the image side. FIGS. 2 to 9 do not show the shape or size of the aperture diaphragm St, but show the position thereof on the optical axis Z. In the examples, in the cross-sectional views illustrating the lenses, Ri and Di (i=1, 2, 3, . . . ) correspond to Ri and Di in the following lens data.

Table 1 shows lens data and various kinds of data of the imaging lens according to Example 1, Table 2 shows aspheric data, and Table 3 shows data related to curvature radius. Similarly, Tables 4 to 33 show lens data, various kinds of data, and aspheric data of the imaging lenses according to Examples 2 to 11. Next, the meaning of the symbols in the tables according to Example 1 will be described, which is basically the same as that in Examples 2 to 11.

In the lens data shown in Table 1, an i-th (i=1, 2, 3, . . . ) surface number is written in the field of a surface number Si. In this case, the surface of a component closest to the object side is given number 1, and the surface number is sequentially increased toward the image side. The curvature radius of the i-th surface from the object side is written in the field of a curvature radius Ri, and the surface spacing between the i-th surface and an (i+1)-th surface on the optical axis Z is written in the field of Di. In addition, when a surface is convex to the object side, the curvature radius of the surface is positive.

When a surface is convex to the image side, the curvature radius of the surface is negative.

In the lens data shown in Table 1, the refractive index of a j-th (j=1, 2, 3, . . . ) optical component from the object side with respect to the d-line (wavelength: 587.6 nm) is written in the field of Ndj. In this case, an optical component arranged closest to the object side is given number 1, and the number is sequentially increased toward the image side. The Abbe number of the j-th optical component with respect to the d-line is written in the field of vdj. In addition, the lens data shown in Table 1 includes the aperture diaphragm St and the optical member PP, and the word (aperture diaphragm) is written in the field of the surface number of a surface corresponding to the aperture diaphragm St.

In various kinds of data shown in Table 1, Fno. indicates the F number, 2ω indicates a total angle of view, L indicates the distance from the object-side surface of the first lens L1 to the image plane Sim on the optical axis Z (the back focal length, which is an air equivalent length), Bf indicates the distance (corresponding to the back focal length, which is an air equivalent length) from the image-side surface of the lens which is arranged closest to the image side to the image plane Sim on the optical axis Z, f indicates the focal length of the entire system, f1 indicates the focal length of the first lens L1, f2 indicates the focal length of the second lens L2, f3 indicates the focal length of the third lens L3, f4 indicates the focal length of the fourth lens L4, ED1 indicates the effective diameter of the object-side surface of the first lens L1, and f12 indicates a composite focal length of the first lens L1 and the second lens L2.

In the lens data shown in Table 1, the symbol '*' added to the surface number indicates an aspheric surface. The lens data shown in Table 1 includes the curvature radius of the aspheric surface near the optical axis (the curvature radius of the center). The aspheric data shown in Table 2 includes the surface number of the aspheric surface and an aspheric coefficient related to each aspheric surface. In aspheric data shown in Table 2, 'E−n' (n is an integer) means '×10$^{-n}$', and 'E+n' means '×10$^{n}$'. The aspheric data includes coefficients KA and RBm (m=3, 4, 5, . . . , 20) of the following aspheric expression:

$$Zd = \frac{C \times Y^2}{1 + \sqrt{1 - KA \times C^2 \times Y^2}} + \sum_m RB_m Y^m \quad \text{[Expression 1]}$$

(where Zd indicates the length of an aspheric surface (the length of a perpendicular line that drops from a point on an aspheric surface at a height Y from the optical axis to a tangent plane to the top of the aspheric surface (a plane vertical to the optical axis)), Y indicates a height (the distance from the optical axis to the lens surface), C indicates paraxial curvature, and KA and RBm indicate aspheric coefficients (m=3, 4, 5, . . . , 20)).

In data related to the curvature radius shown in Table 3, the surface number, the absolute value of the curvature radius at the effective diameter edge, and the ratio of the absolute value of the curvature radius at the effective diameter edge and the absolute value of the curvature radius at the center are represented by the above-mentioned symbols. |RX3| indicates the absolute value of the curvature radius of the object-side surface of the second lens L2 at the effective diameter edge, and |RX3|/|R3| indicates the ratio of the absolute value of the curvature radius of the object-side surface of the second lens L2 at the effective diameter edge and the absolute value of the curvature radius thereof at the center. |RX4| indicates the absolute value of the curvature radius of the image-side surface of the second lens L2 at the effective diameter edge, and |RX4|/|R4| indicates the ratio of the absolute value of the curvature radius of the image-side surface of the second lens L2 at the effective diameter edge and the absolute value of the curvature radius thereof at the center. |RX5| indicates the absolute value of the curvature radius of the object-side surface of the third lens L3 at the effective diameter edge, and |RX5|/|R5| indicates the ratio of the absolute value of the curvature radius of the object-side surface of the third lens L3 at the effective diameter edge and the absolute value of the curvature radius thereof at the center. |RX6| indicates the absolute value of the curvature radius of the image-side surface of the third lens L3 at the effective diameter edge, and |RX6|/|R6| indicates the ratio of the absolute value of the curvature radius of the image-side surface of the third lens L3 at the effective diameter edge and the absolute value of the curvature radius thereof at the center. |RX8| indicates the absolute value of the curvature radius of the object-side surface of the fourth lens L4 at the effective diameter edge, and |RX8|/|R8| indicates the ratio of the absolute value of the curvature radius of the object-side surface of the fourth lens L4 at the effective diameter edge and the absolute value of the curvature radius thereof at the center. |RX9| indicates the absolute value of the curvature radius of the image-side surface of the fourth lens L4 at the effective diameter edge, and |RX9|/|R9| indicates the ratio of the absolute value of the curvature radius of the image-side surface of the fourth lens L4 at the effective diameter edge and the absolute value of the curvature radius thereof at the center.

Tables 1 to 3 show numerical values with predetermined digits. The unit of each numerical value is as follows. In Table 1, the unit of 2ω is 'degree', and the unit of length is 'mm'. However, these are just illustrative, and other appropriate units may be used since the optical system can be used during proportional enlargement or proportional reduction.

TABLE 1

| Example 1 Lens data | | | | |
|---|---|---|---|---|
| Si | Ri | Di | Ndj | vdj |
| 1 | 26.3878 | 1.2000 | 1.77250 | 49.6 |
| 2 | 3.5703 | 0.5000 | | |
| 3* | 1.2759 | 1.2998 | 1.53159 | 55.4 |
| 4* | 0.6125 | 1.2761 | | |
| 5* | 2.5752 | 2.1492 | 1.61396 | 25.5 |
| 6* | −8.7175 | 0.4485 | | |
| 7 (Aperture diaphragm) | ∞ | 0.2670 | | |
| 8* | −12.4905 | 1.6988 | 1.53159 | 55.4 |
| 9* | −1.0308 | 1.3078 | | |
| 10 | ∞ | 0.5000 | 1.52310 | 54.5 |
| 11 | ∞ | 0.5000 | | |
| Image surface | ∞ | | | |

| Example 1 Various kinds of data | |
|---|---|
| Fno. | 2.8 |
| 2ω | 153.4 |
| L | 10.98 |
| Bf | 2.14 |
| f | 1.24 |
| f1 | −5.47 |
| f2 | −6.92 |
| f3 | 3.49 |
| f4 | 2.01 |
| ED1 | 10.16 |
| f12 | −2.12 |

TABLE 2

Example 1 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −4.7987304E−02 | −1.9364816E−01 | 5.4901485E−03 | 4.3990137E−02 | −4.3978525E−02 | 3.1606016E−02 |
| RB4 | −1.1158933E−02 | 3.0691930E−02 | 1.2566396E−02 | 1.3756395E−02 | 5.7906678E−01 | −1.5179949E−01 |
| RB5 | −7.7706022E−04 | −2.1784011E−02 | 5.5615906E−03 | −3.4499085E−02 | −3.7933681E+00 | 2.6091360E−01 |
| RB6 | 9.0391637E−08 | 2.7961352E−03 | −1.6272307E−03 | 1.4640238E−02 | 8.6657305E+00 | −1.2588548E−01 |
| RB7 | 4.5882072E−05 | 2.1268919E−03 | 3.2663752E−03 | 2.2806548E−02 | −1.7543649E+00 | −5.0106362E−02 |
| RB8 | 2.7410739E−05 | 6.3423972E−04 | 1.6314199E−03 | −3.5959119E−03 | −1.4056905E+01 | 1.0723301E−02 |
| RB9 | 6.6955917E−06 | 6.1611273E−05 | −1.3947409E−03 | −2.3339521E−02 | −1.5095082E+01 | 2.0801940E−02 |
| RB10 | 1.2610842E−06 | −3.1657942E−05 | −9.7640318E−04 | −1.3074773E−02 | 3.4961345E+01 | 9.7453071E−03 |
| RB11 | 1.6603552E−07 | −2.1972872E−05 | 5.1318680E−04 | 2.2186615E−02 | 7.4660672E+01 | −1.3970995E−03 |
| RB12 | −2.7064491E−08 | 3.6528016E−06 | 2.0101810E−04 | 1.7336099E−02 | −4.1688728E+01 | −3.4188573E−03 |
| RB13 | −5.8496657E−09 | −5.2941456E−06 | 5.7027525E−06 | −1.9399863E−02 | −1.3891012E+02 | −2.7158515E−03 |
| RB14 | −2.3303898E−09 | −3.2838223E−06 | −3.0073231E−05 | −5.8029480E−03 | −5.4903533E+01 | −1.2346770E−03 |
| RB15 | −9.1786365E−10 | −1.8835255E−06 | −1.7751494E−05 | 9.4010265E−03 | 9.7566467E+01 | −1.1661201E−04 |
| RB16 | −2.8117560E−10 | −8.0874518E−07 | −3.4927188E−06 | −2.0894378E−13 | 1.0865720E+02 | 3.2377341E−04 |
| RB17 | −8.9114642E−11 | 4.6488116E−08 | 9.2630433E−07 | −4.3632076E−04 | 7.6715938E+02 | 4.1524173E−04 |
| RB18 | −2.2215590E−11 | 2.1491200E−07 | 1.2664728E−06 | 1.0544177E−03 | −9.8293759E+01 | 4.6769767E−04 |
| RB19 | −5.3739513E−12 | 1.4818157E−07 | 4.7241692E−07 | −9.7251573E−04 | −1.3344215E+03 | 6.7184280E−05 |
| RB20 | −1.1414716E−12 | −5.0900333E−08 | −2.2429377E−07 | 2.9996370E−04 | 8.3401478E+02 | −1.9585131E−04 |

TABLE 3

Example 1 Data related to curvature radius

| Surface number | Effective diameter end | | Ratio of effective diameter end to center | |
|---|---|---|---|---|
| 3 | \|RX3\| | 5.86 | \|RX3\|/\|R3\| | 4.59 |
| 4 | \|RX4\| | 2.27 | \|RX4\|/\|R4\| | 3.71 |
| 5 | \|RX5\| | 2.14 | \|RX5\|/\|R5\| | 0.83 |
| 6 | \|RX6\| | 163.60 | \|RX6\|/\|R6\| | 18.77 |
| 8 | \|RX8\| | 4.81 | \|RX8\|/\|R8\| | 0.39 |
| 9 | \|RX9\| | 1.53 | \|RX9\|/\|R9\| | 1.49 |

TABLE 4

Example 2 Lens data

| Si | Ri | Di | Ndj | vdj |
|---|---|---|---|---|
| 1 | 26.0220 | 1.2000 | 1.77250 | 49.6 |
| 2 | 3.5535 | 0.5216 | | |
| 3* | 1.2722 | 1.3426 | 1.53159 | 55.4 |
| 4* | 0.6110 | 1.2747 | | |
| 5* | 2.5704 | 2.1500 | 1.61396 | 25.5 |

TABLE 4-continued

| | | | | |
|---|---|---|---|---|
| 6* | −8.7250 | 0.4522 | | |
| 7 (Aperture diaphragm) | ∞ | 0.2688 | | |
| 8* | −12.1944 | 1.6790 | 1.53159 | 55.4 |
| 9* | −1.0321 | 1.3112 | | |
| 10 | ∞ | 0.5000 | 1.52310 | 54.5 |
| 11 | ∞ | 0.5000 | | |
| Image Surface | ∞ | | | |

Example 2 Various kinds of data

| | |
|---|---|
| Fno. | 2.8 |
| 2ω | 154.4 |
| L | 11.03 |
| Bf | 2.14 |
| f | 1.26 |
| f1 | −5.45 |
| f2 | −7.49 |
| f3 | 3.49 |
| f4 | 2.02 |
| ED1 | 10.26 |
| f12 | −2.14 |

TABLE 5

Example 2 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −4.8187742E−02 | −1.9297218E−01 | 7.5642626E−03 | 4.3192235E−02 | −4.0544366E−02 | 2.9705041E−02 |
| RB4 | −1.1160853E−02 | 3.0754986E−02 | 1.2446232E−02 | 1.3968002E−02 | 5.7871073E−01 | −1.5156772E−01 |
| RB5 | −7.7701004E−04 | −2.1778712E−02 | 5.5471827E−03 | −3.4581565E−02 | −3.7935666E+00 | 2.6096506E−01 |
| RB6 | 3.5755304E−08 | 2.7966188E−03 | −1.6271087E−03 | 1.4590648E−02 | 8.6656723E+00 | −1.2587267E−01 |
| RB7 | 4.5790677E−05 | 2.1269098E−03 | 3.2673475E−03 | 2.2789766E−02 | −1.7643758E+00 | −5.0102522E−02 |
| RB8 | 2.7372146E−05 | 6.3423191E−04 | 1.6318776E−03 | −3.6008571E−03 | −1.4056906E+01 | 1.0724419E−02 |
| RB9 | 6.6830468E−06 | 6.1609725E−05 | −1.3945852E−03 | −2.3340977E−02 | −1.5095081E+01 | 2.0802237E−02 |
| RB10 | 1.2572979E−06 | −3.1657328E−05 | −9.7635802E−04 | −1.3075228E−02 | 3.4961345E+01 | 9.7453781E−03 |
| RB11 | 1.6497759E−07 | −2.1972262E−05 | 5.1319860E−04 | 2.2186464E−02 | 7.4660672E+01 | −1.3970844E−03 |
| RB12 | −2.7347796E−08 | 3.6531102E−06 | 2.0102094E−04 | 1.7336047E−02 | −4.1688728E+01 | −3.4188546E−03 |
| RB13 | −5.9231006E−09 | −5.2940217E−06 | 5.7033866E−06 | −1.9399881E−02 | −1.3891012E+02 | −2.7158512E−03 |
| RB14 | −2.3489259E−09 | −3.2837785E−06 | −3.0073101E−05 | −5.8029544E−03 | −5.4903533E+01 | −1.2346771E−03 |

TABLE 5-continued

Example 2 Aspheric data

| Si | 3 | 4 | 5 | 6 | 8 | 9 |
|---|---|---|---|---|---|---|
| RB15 | −9.2243940E−10 | −1.8835112E−06 | −1.7751470E−05 | 9.4010243E−03 | 9.7566467E+01 | −1.1661205E−04 |
| RB16 | −2.8228387E−10 | −8.0874078E−07 | −3.4927150E−06 | −2.0894385E−03 | −1.0855720E+02 | 3.2377339E−04 |
| RB17 | −8.9378581E−11 | 4.6489417E−08 | 9.2630469E−07 | −4.3632100E−04 | 7.6715938E+02 | 4.1524172E−04 |
| RB18 | −2.2277499E−11 | 2.1491237E−07 | 1.2664727E−06 | 1.0544177E−03 | −9.6293759E+01 | 4.6769767E−04 |
| RB19 | −5.3882845E−12 | 1.4818167E−07 | 4.7241687E−07 | −9.7251575E−04 | −1.3344215E+03 | 6.1784280E−05 |
| RB20 | −1.1447503E−12 | −5.0900305E−08 | −2.2429379E−07 | 2.9996370E−04 | 8.3401478E+02 | −1.9585131E−04 |

TABLE 6

Example 2 Data related to curvature radius

| Surface number | Effective diameter end | | Ratio of effective diameter end to center | |
|---|---|---|---|---|
| 3 | |RX3| | 5.89 | |RX3|/|R3| | 4.63 |
| 4 | |RX4| | 2.26 | |RX4|/|R4| | 3.69 |
| 5 | |RX5| | 2.13 | |RX5|/|R5| | 0.83 |
| 6 | |RX6| | 254.51 | |RX6|/|R6| | 29.17 |
| 8 | |RX8| | 4.89 | |RX8|/|R8| | 0.40 |
| 9 | |RX9| | 1.52 | |RX9|/|R9| | 1.48 |

TABLE 7

Example 3 Lens data

| Si | Ri | Di | Ndj | vdj |
|---|---|---|---|---|
| 1 | 26.3261 | 1.2000 | 1.77250 | 49.6 |
| 2 | 3.5507 | 0.5000 | | |
| 3* | 1.2509 | 1.2998 | 1.53159 | 55.4 |
| 4* | 0.6247 | 1.2622 | | |
| 5* | 2.8079 | 2.1494 | 1.61396 | 25.5 |
| 6* | −8.0887 | 0.4490 | | |
| 7 (Aperture diaphragm) | ∞ | 0.2701 | | |
| 8* | −12.7911 | 1.7094 | 1.53159 | 55.4 |
| 9* | −1.0264 | 1.1755 | | |
| 10 | ∞ | 0.7000 | 1.52310 | 54.5 |
| 11 | ∞ | 0.5000 | | |
| Image surface | ∞ | | | |

Example 3 Various kinds of data

| Fno. | 2.8 |
|---|---|
| 2ω | 153.4 |
| L | 10.97 |
| Bf | 2.14 |
| f | 1.26 |
| f1 | −5.44 |
| f2 | −8.40 |
| f3 | 3.67 |
| f4 | 2.00 |
| ED1 | 10.11 |
| f12 | −2.25 |

TABLE 8

Example 3 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −5.0749787E−02 | −1.9561822E−01 | 1.1769663E−02 | 4.5737512E−02 | −4.2331897E−02 | 3.2150620E−02 |
| RB4 | −1.1414282E−02 | 3.1461096E−02 | 1.1044735E−02 | 1.6823806E−02 | 5.8187913E−01 | −1.5247666E−01 |
| RB5 | −7.5994029E−04 | −2.1520587E−02 | 5.0344305E−03 | −3.7092359E−02 | −3.7974099E+00 | 2.6231828E−01 |
| RB6 | 1.0108591E−05 | 2.8467645E−03 | −1.6200058E−03 | 1.4639732E−02 | 8.6644511E+00 | −1.2514020E−01 |
| RB7 | 4.8462984E−05 | 2.1321003E−03 | 3.3218606E−03 | 2.3245905E−02 | −1.7542035E+00 | −4.9925972E−02 |
| RB8 | 2.7901010E−05 | 6.3398808E−04 | 1.6573887E−03 | −3.4070738E−03 | −1.4056604E+01 | 1.0735796E−02 |
| RB9 | 6.7542260E−06 | 6.1407894E−05 | −1.3863981E−03 | −2.3315336E−02 | −1.5094918E+01 | 2.0790487E−02 |
| RB10 | 1.2577423E−06 | −3.1672459E−05 | −9.7422891E−04 | −1.3096348E−02 | 3.4961411E+01 | 9.7376969E−03 |
| RB11 | 1.6120793E−07 | −2.1952030E−05 | 5.1365935E−04 | 2.2165291E−02 | 7.4660695E+01 | −1.4003510E−03 |
| RB12 | −2.8978151E−08 | 3.6688103E−06 | 2.0109822E−04 | 1.7323402E−02 | −4.1688721E+01 | −3.4200265E−03 |
| RB13 | −6.4115928E−09 | −5.2881208E−06 | 5.7093334E−06 | −1.9406076E−02 | −1.3891012E+02 | −2.7162343E−03 |
| RB14 | −2.4678933E−09 | −3.2816889E−06 | −3.0075616E−05 | −5.8056688E−03 | −5.4903532E+01 | −1.2347952E−03 |
| RB15 | −9.4618007E−10 | −1.8828550E−06 | −1.7753188E−05 | 9.3999201E−03 | 9.7566467E+01 | −1.1664706E−04 |
| RB16 | −2.8569153E−10 | −8.0855229E−07 | −3.4934218E−06 | −2.0898641E−03 | −1.0855720E+02 | 3.2376329E−04 |
| RB17 | −8.9436495E−11 | 4.6539542E−08 | 9.2606118E−07 | −4.3647847E−04 | 7.6715938E+02 | 4.1523887E−04 |
| RB18 | −2.2061541E−11 | 2.1492470E−07 | 1.2663966E−06 | 1.0543613E−03 | −9.8293759E+01 | 4.6769687E−04 |
| RB19 | −5.2752030E−12 | 1.4818443E−07 | 4.7239449E−07 | −9.7253542E−04 | −1.3344215E+03 | 6.7184060E−05 |
| RB20 | −1.1020955E−12 | −5.0899770E−08 | −2.2430006E−07 | 2.9996370E−04 | 8.3401478E+02 | −1.9585137E−04 |

TABLE 9

Example 3 Data related to curvature radius

| Surface number | Effective diameter end | | Ratio of effective diameter end to center | |
|---|---|---|---|---|
| 3 | \|RX3\| | 6.00 | \|RX3\|/\|R3\| | 4.79 |
| 4 | \|RX4\| | 2.30 | \|RX4\|/\|R4\| | 3.68 |
| 5 | \|RX5\| | 2.15 | \|RX5\|/\|R5\| | 0.77 |
| 6 | \|RX6\| | 161.40 | \|RX6\|/\|R6\| | 19.95 |
| 8 | \|RX8\| | 4.90 | \|RX8\|/\|R8\| | 0.38 |
| 9 | \|RX9\| | 1.54 | \|RX9\|/\|R9\| | 1.50 |

TABLE 10

Example 4 Lens data

| Si | Ri | Di | Ndj | vdj |
|---|---|---|---|---|
| 1 | 26.3056 | 1.2000 | 1.77250 | 49.6 |
| 2 | 3.5411 | 0.5000 | | |
| 3* | 1.2337 | 1.2999 | 1.53159 | 55.4 |
| 4* | 0.6332 | 1.2567 | | |
| 5* | 2.9476 | 2.1493 | 1.61396 | 25.5 |
| 6* | −7.7323 | 0.4491 | | |
| 7 (Aperture diaphragm) | ∞ | 0.2708 | | |
| 8* | −12.6330 | 1.7121 | 1.53159 | 55.4 |
| 9* | −1.0278 | 1.1775 | | |
| 10 | ∞ | 0.7000 | 1.52310 | 54.5 |
| 11 | ∞ | 0.5000 | | |
| Image surface | ∞ | | | |

Example 4 Various kinds of data

| | |
|---|---|
| Fno. | 2.8 |
| 2ω | 154.0 |
| L | 10.97 |
| Bf | 2.14 |
| f | 1.29 |
| f1 | −5.42 |
| f2 | −9.84 |
| f3 | 3.76 |
| f4 | 2.00 |
| ED1 | 10.09 |
| f12 | −2.35 |

TABLE 11

Example 4 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −5.2172533E−02 | −1.9616479E−01 | 1.3693970E−02 | 4.5782508E−03 | −4.3243887E−02 | 3.0107353E−02 |
| RB4 | −1.1598340E−02 | 3.1753630E−02 | 1.0066242E−02 | 1.6830759E−02 | 5.8194759E−01 | −1.5210138E−01 |
| RB5 | −7.7481646E−04 | −2.1460849E−02 | 4.8885899E−03 | −3.7219974E−02 | −3.7975065E+00 | 2.6248982E−01 |
| RB6 | 1.0012082E−05 | 2.8551655E−03 | −1.6286098E−03 | 1.4691230E−02 | 8.6644613E+00 | −1.2509641E−01 |
| RB7 | 4.8776628E−05 | 2.1328948E−03 | 3.3258069E−03 | 2.3302780E−02 | −1.7541589E+00 | −4.9921623E−02 |
| RB8 | 2.7985721E−05 | 6.3400034E−04 | 1.6595198E−03 | −3.3814442E−03 | −1.4056574E+01 | 1.0733573E−02 |
| RB9 | 8.7674844E−06 | 6.1401491E−05 | −1.3856944E−03 | −2.3307786E−02 | −1.5094904E+01 | 2.0788780E−02 |
| RB10 | 1.2581034E−06 | −3.1668062E−05 | −9.7404016E−04 | −1.3095173E−02 | 3.4961416E+01 | 9.7369371E−03 |
| RB11 | 1.6052579E−07 | −2.1947729E−05 | 5.1370261E−04 | 2.2164974E−02 | 7.4660697E+01 | −1.4006312E−03 |
| RB12 | −2.9320441E−08 | 3.6090025E−06 | 2.0110652E−04 | 1.7323002E−02 | −4.1688720E+01 | −3.4201197E−03 |
| RB13 | −6.5310524E−09 | −5.2872422E−06 | 5.7104725E−06 | −1.9406317E−02 | −1.3891012E+02 | −2.7166333E−03 |
| RB14 | −2.5036582E−09 | −3.2813803E−06 | −3.0075823E−05 | −5.8057851E−03 | −5.4903532E+01 | −1.2348039E−03 |
| RB15 | −9.5398872E−10 | −1.8827554E−06 | −1.7753272E−05 | 9.3998700E−03 | 9.7566467E+01 | −1.1664958E−04 |
| RB16 | −2.8821376E−10 | −8.0852201E−07 | −3.4934644E−06 | −2.0898842E−03 | −1.0855720E+02 | 3.2376257E−04 |
| RB17 | −9.0058493E−11 | 4.6548328E−08 | 9.2604509E−07 | −4.3648614E−04 | 7.6715938E+02 | 4.1523867E−04 |
| RB18 | −2.2209100E−11 | 2.1492716E−07 | 1.2663912E−06 | 1.0543585E−03 | −9.8293759E+01 | 4.6769682E−04 |
| RB19 | −5.3091767E−12 | 1.4818510E−07 | 4.7239285E−07 | −9.7253642E−04 | −1.3344215E+03 | 6.7184045E−05 |
| RB20 | −1.1097051E−12 | −5.0899595E−08 | −2.2430054E−07 | 2.9996370E−04 | 8.3401478E+02 | −1.9585138E−04 |

TABLE 12

Example 4 Data related to curvature radius

| Surface number | Effective diameter end | | Ratio of effective diameter end to center | |
|---|---|---|---|---|
| 3 | \|RX3\| | 6.18 | \|RX3\|/\|R3\| | 5.01 |
| 4 | \|RX4\| | 2.33 | \|RX4\|/\|R4\| | 3.68 |
| 5 | \|RX5\| | 2.17 | \|RX5\|/\|R5\| | 0.74 |
| 6 | \|RX6\| | 685.37 | \|RX6\|/\|R6\| | 88.64 |
| 8 | \|RX8\| | 4.84 | \|RX8\|/\|R8\| | 0.38 |
| 9 | \|RX9\| | 1.54 | \|RX9\|/\|R9\| | 1.50 |

TABLE 13

Example 5 Lens data

| Si | Ri | Di | Ndj | vdj |
|---|---|---|---|---|
| 1 | 26.2634 | 1.2000 | 1.77250 | 49.6 |
| 2 | 3.5312 | 0.5000 | | |
| 3* | 1.2238 | 1.2999 | 1.53159 | 55.4 |
| 4* | 0.6410 | 1.2504 | | |
| 5* | 3.0886 | 2.1495 | 1.61396 | 25.5 |
| 6* | −7.4925 | 0.4492 | | |
| 7 (Aperture diaphragm) | ∞ | 0.2722 | | |
| 8* | −12.6787 | 1.7175 | 1.53159 | 55.4 |
| 9* | −1.0261 | 1.1763 | | |
| 10 | ∞ | 0.7000 | 1.52310 | 54.5 |
| 11 | ∞ | 0.5000 | | |
| Image surface | ∞ | | | |

Example 5 Various kinds of data

| | |
|---|---|
| Fno. | 2.8 |
| 2ω | 154.0 |
| L | 10.97 |
| Bf | 2.14 |
| f | 1.30 |
| f1 | −5.41 |
| f2 | −11.21 |
| f3 | 3.86 |
| f4 | 2.00 |
| ED1 | 10.07 |
| f12 | −2.43 |

TABLE 14

Example 5 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −5.3120647E−02 | −1.9616616E−01 | 1.6621312E−02 | 4.8556862E−02 | −4.2901876E−02 | 2.9367799E−02 |
| RB4 | −1.1746017E−02 | 3.2186344E−02 | 9.1484904E−03 | 1.7021184E−02 | 6.8123211E−01 | −1.5147798E−01 |
| RB5 | −7.7452807E−04 | −2.1387667E−02 | 4.7551471E−03 | −3.7563085E−02 | −3.7982075E+00 | 2.6273203E−01 |
| RB6 | 1.3850121E−05 | 2.8629667E−03 | −1.6293104E−03 | 1.4699731E−02 | 8.6643227E+00 | −1.2502895E−01 |
| RB7 | 4.9896470E−05 | 2.1327569E−03 | 3.3343802E−03 | 2.3367434E−02 | −1.7541069E+00 | −4.9914716E−02 |
| RB8 | 2.8214961E−05 | 6.3364151E−04 | 1.6635771E−03 | −3.3495135E−03 | −1.4056520E+01 | 1.0729593E−02 |
| RB9 | 6.8017558E−06 | 6.1286214E−05 | −1.3843452E−03 | −2.3299035E−02 | −1.5094877E+01 | 2.0785727E−02 |
| RB10 | 1.2601436E−06 | −3.1689872E−05 | −9.7366511E−04 | −1.3094571E−02 | 3.4961427E+01 | 9.7355489E−03 |
| RB11 | 1.5948259E−07 | −2.1948517E−05 | 5.1379375E−04 | 2.2163973E−02 | 7.4660701E+01 | −1.4011490E−03 |
| RB12 | −2.9911941E−08 | 3.6705320E−06 | 2.0112581E−04 | 1.7322177E−02 | −4.1688719E+01 | −3.4202935E−03 |
| RB13 | −6.7428077E−09 | −5.2863227E−06 | 5.7138215E−06 | −1.9406769E−02 | −1.3891012E+02 | −2.7163180E−03 |
| RB14 | −2.5676227E−09 | −3.2810031E−06 | −3.0075270E−05 | −5.8059952E−03 | −5.4903532E+01 | −1.2348203E−03 |
| RB15 | −9.7357422E−10 | −1.8826233E−06 | −1.7753325E−05 | 9.3997816E−03 | 9.7566467E+01 | −1.1665440E−04 |
| RB16 | −2.9276315E−10 | −8.0847987E−07 | −3.4935157E−06 | −2.0899191E−03 | −1.0855720E+02 | 3.2376119E−04 |
| RB17 | −9.1184279E−11 | 4.6560931E−08 | 9.2602254E−07 | −4.3649925E−04 | 7.6715938E+02 | 4.1523828E−04 |
| RB18 | −2.2477381E−11 | 2.1493074E−07 | 1.2663832E−06 | 1.0543537E−03 | −9.8293759E+01 | 4.6769671E−04 |
| RB19 | −5.3712811E−12 | 1.4818608E−07 | 4.7239029E−07 | −9.7253809E−04 | −1.3344215E+03 | 6.7184015E−05 |
| RB20 | −1.1237119E−12 | −5.0899338E−08 | −2.2430131E−07 | 2.9996370E−04 | 8.3401478E+02 | −1.9585138E−04 |

TABLE 15

Example 5 Data related to curvature radius

| Surface number | Effective diameter end | | Ratio of effective diameter end to center | |
|---|---|---|---|---|
| 3 | \|RX3\| | 6.25 | \|RX3\|/\|R3\| | 5.10 |
| 4 | \|RX4\| | 2.35 | \|RX4\|/\|R4\| | 3.67 |
| 5 | \|RX5\| | 2.18 | \|RX5\|/\|R5\| | 0.71 |
| 6 | \|RX6\| | 3447.76 | \|RX6\|/\|R6\| | 460.16 |
| 8 | \|RX8\| | 4.81 | \|RX8\|/\|R8\| | 0.38 |
| 9 | \|RX9\| | 1.54 | \|RX9\|/\|R9\| | 1.50 |

TABLE 16

Example 6 Lens data

| Si | Ri | Di | Ndj | vdj |
|---|---|---|---|---|
| 1 | 27.3575 | 1.2000 | 1.77250 | 49.6 |
| 2 | 3.6654 | 0.5000 | | |
| 3* | 1.1717 | 1.2996 | 1.53159 | 55.4 |
| 4* | 0.5896 | 1.4542 | | |
| 5* | 3.3475 | 2.1481 | 1.61396 | 25.5 |
| 6* | −7.4030 | 0.4471 | | |
| 7 (Aperture diaphragm) | ∞ | 0.2567 | | |
| 8* | −33.7036 | 1.6934 | 1.53159 | 55.4 |
| 9* | −0.9903 | 1.0144 | | |
| 10 | ∞ | 0.7000 | 1.52310 | 54.5 |
| 11 | ∞ | 0.5000 | | |
| Image surface | ∞ | | | |

Example 6 Various kinds of data

| | |
|---|---|
| Fno. | 2.8 |
| 2ω | 184.2 |
| L | 10.97 |
| Bf | 1.97 |
| f | 1.15 |
| f1 | −5.60 |
| f2 | −9.92 |
| f3 | 4.06 |
| f4 | 1.89 |
| ED1 | 11.06 |
| f12 | −2.36 |

TABLE 17

Example 6 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −4.0953159E−02 | −2.0178150E−01 | 1.9109533E−02 | 4.3275126E−02 | −4.1613423E−02 | 4.6387660E−02 |
| RB4 | −1.4790778E−02 | 3.3303663E−02 | 1.0028105E−02 | 1.4663478E−02 | 5.9066093E−01 | −1.4817687E−01 |
| RB5 | −1.3552294E−03 | −2.1187973E−02 | 4.9200289E−03 | −3.7844021E−02 | −3.8001941E+00 | 2.6195090E−01 |
| RB6 | −6.3451876E−05 | 2.8741798E−03 | −1.5863512E−03 | 1.5370203E−02 | 8.6625532E+00 | −1.2570203E−01 |
| RB7 | 3.9324498E−05 | 2.1157673E−03 | 3.3561648E−03 | 2.3716395E−02 | −1.7545999E+00 | −5.0234005E−02 |
| RB8 | 2.8184686E−05 | 6.3059598E−04 | 1.6764051E−03 | −3.3166992E−03 | −1.4056574E+01 | 1.0603458E−02 |
| RB9 | 7.2379741E−06 | 5.9935815E−05 | −1.3794641E−03 | −2.3364161E−02 | −1.5094855E+01 | 2.0741476E−02 |
| RB10 | 1.4126093E−06 | −3.2145192E−05 | −9.7219046E−04 | −1.3155744E−02 | 3.4961444E+01 | 9.7212843E−03 |
| RB11 | 2.0293542E−07 | −2.2031321E−05 | 5.1417691E−04 | 2.2126927E−02 | 7.4660708E+01 | −1.4054684E−03 |
| RB12 | −1.8974401E−08 | 3.6348434E−06 | 2.0120976E−04 | 1.7303542E−02 | −4.1688716E+01 | −3.4215411E−03 |
| RB13 | −4.1848682E−09 | −5.2953809E−06 | 6.7285240E−06 | −1.9415190E−02 | −1.3891012E+02 | −2.7166658E−03 |

TABLE 17-continued

Example 6 Aspheric data

| Si | 3 | 4 | 5 | 6 | 8 | 9 |
|---|---|---|---|---|---|---|
| RB14 | −1.9983127E−09 | −3.2832096E−06 | −3.0073846E−05 | −5.8095409E−03 | −5.4903532E+01 | −1.2349146E−03 |
| RB15 | −8.5124512E−10 | −1.8831484E−06 | −1.7753657E−05 | 9.3983617E−03 | 9.7566467E+01 | −1.1667944E−04 |
| RB16 | −2.6709409E−10 | −8.0860436E−07 | −3.4937903E−06 | −2.0904673E−03 | −1.0855720E+02 | 3.2375465E−04 |
| RB17 | −8.6851956E−11 | 4.6530851E−08 | 9.2590396E−07 | −4.3670514E−04 | 7.6715938E+02 | 4.1523659E−04 |
| RB18 | −2.1651724E−11 | 2.1492315E−07 | 1.2663412E−06 | 1.0542780E−03 | −9.8293769E+01 | 4.6769627E−04 |
| RB19 | −5.2186011E−12 | 1.4818404E−07 | 4.7237687E−07 | −9.7256556E−04 | −1.3344215E+03 | 6.7183905E−05 |
| RB20 | −1.0959849E−12 | −5.0899922E−08 | −2.2430532E−07 | 2.9996370E−04 | 8.3401478E+02 | −1.9585141E−04 |

TABLE 18

Example 6 Data related to curvature radius

| Surface number | Effective diameter end | | Ratio of effective diameter end to center | |
|---|---|---|---|---|
| 3 | \|RX3\| | 8.24 | \|RX3\|/\|R3\| | 7.03 |
| 4 | \|RX4\| | 2.26 | \|RX4\|/\|R4\| | 3.83 |
| 5 | \|RX5\| | 2.18 | \|RX5\|/\|R5\| | 0.65 |
| 6 | \|RX6\| | 60.33 | \|RX6\|/\|R6\| | 8.15 |
| 8 | \|RX8\| | 6.77 | \|RX8\|/\|R8\| | 0.20 |
| 9 | \|RX9\| | 1.55 | \|RX9\|/\|R9\| | 1.57 |

TABLE 19

Example 7 Lens data

| Si | Ri | Di | Ndj | νdj |
|---|---|---|---|---|
| 1 | 27.2198 | 1.2000 | 1.77250 | 49.6 |
| 2 | 3.6318 | 0.5000 | | |
| 3* | 1.1489 | 1.2997 | 1.53159 | 55.4 |
| 4* | 0.5948 | 1.4348 | | |
| 5* | 3.5762 | 2.1482 | 1.61396 | 25.5 |
| 6* | −7.0812 | 0.4474 | | |
| 7 (Aperture diaphragm) | ∞ | 0.2611 | | |
| 8* | −26.7937 | 1.6924 | 1.53159 | 55.4 |
| 9* | −0.9888 | 0.8000 | | |
| 10 | ∞ | 0.7000 | 1.52310 | 54.5 |
| 11 | ∞ | 0.7299 | | |
| Image surface | ∞ | | | |

Example 7 Various kinds of data

| | |
|---|---|
| Fno. | 2.8 |
| 2ω | 184.2 |
| L | 10.97 |
| Bf | 1.99 |
| f | 1.18 |
| f1 | −5.55 |
| f2 | −12.48 |
| f3 | 4.19 |
| f4 | 1.89 |
| ED1 | 10.98 |
| f12 | −2.48 |

TABLE 20

Example 7 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −4.1200462E−02 | −2.0556153E−01 | 2.2319989E−02 | 4.4042773E−02 | −4.3672286E−02 | 4.2814393E−02 |
| RB4 | −1.5771092E−02 | 3.3759829E−02 | 8.9006866E−03 | 1.5123805E−02 | 5.9218335E−01 | −1.4637281E−01 |
| RB5 | −1.4607581E−03 | −2.1215700E−02 | 4.7847396E−03 | −3.8218576E−02 | −3.8020411E+00 | 2.6175698E−01 |
| RB6 | −6.4320968E−05 | 2.8459165E−03 | −1.5773319E−03 | 1.5603200E−02 | 8.6615070E+00 | −1.2598455E−01 |
| RB7 | 4.2583291E−05 | 2.1046068E−03 | 3.3754431E−03 | 2.3932692E−02 | −1.7548643E+00 | −5.0373393E−02 |
| RB8 | 2.9358087E−05 | 6.2707493E−04 | 1.6865274E−03 | −3.2408843E−03 | −1.4056598E+01 | 1.0549841E−02 |
| RB9 | 7.5359609E−06 | 5.8949827E−05 | −1.3756077E−03 | −2.3357565E−02 | −1.5094842E+01 | 2.0723275E−02 |
| RB10 | 1.4873662E−06 | −3.2396450E−05 | −9.7095610E−04 | −1.3165702E−02 | 3.4961453E+01 | 9.7155742E−03 |
| RB11 | 2.1664369E−07 | −2.2139518E−05 | 5.1452746E−04 | 2.2118231E−02 | 7.4660712E+01 | −1.4071651E−03 |
| RB12 | −1.7045759E−08 | 3.6229053E−06 | 2.0130024E−04 | 1.7298663E−02 | −4.1688715E+01 | −3.4220260E−03 |
| RB13 | −4.0943971E−09 | −5.2973748E−06 | 5.7498852E−06 | −1.9417463E−02 | −1.3891012E+02 | −2.7168006E−03 |
| RB14 | −2.0697899E−09 | −3.2833866E−06 | −3.0069275E−05 | −5.8104902E−03 | −5.4903532E+01 | −1.2349514E−03 |
| RB15 | −8.9033651E−10 | −1.8830974E−06 | −1.7752803E−05 | 9.3979939E−03 | 9.7566467E+01 | −1.1668934E−04 |
| RB16 | −2.8139482E−10 | −8.0856500E−07 | −3.4936682E−06 | −2.0906021E−03 | −1.0855720E+02 | 3.2375201E−04 |
| RB17 | −9.1361050E−11 | 4.6547786E−08 | 9.2590832E−07 | −4.3675249E−04 | 7.6715938E+02 | 4.1523589E−04 |
| RB18 | −2.2949425E−11 | 2.1492920E−07 | 1.2663353E−06 | 1.0542620E−03 | −9.8293759E+01 | 4.6769609E−04 |
| RB19 | −5.5728307E−12 | 1.4818600E−07 | 4.7237358E−07 | −9.7257085E−04 | −1.3344215E+03 | 6.7183856E−05 |
| RB20 | −1.1888733E−12 | −5.0899323E−08 | −2.2430659E−07 | 2.9996370E−04 | 8.3401478E+02 | −1.9585142E−04 |

TABLE 21

Example 7 Data related to curvature radius

| Surface number | Effective diameter end | | Ratio of effective diameter end to center | |
|---|---|---|---|---|
| 3 | \|RX3\| | 8.78 | \|RX3\|/\|R3\| | 7.64 |
| 4 | \|RX4\| | 2.30 | \|RX4\|/\|R4\| | 3.87 |
| 5 | \|RX5\| | 2.19 | \|RX5\|/\|R5\| | 0.61 |
| 6 | \|RX6\| | 64.10 | \|RX6\|/\|R6\| | 9.05 |
| 8 | \|RX8\| | 6.25 | \|RX8\|/\|R8\| | 0.23 |
| 9 | \|RX9\| | 1.54 | \|RX9\|/\|R9\| | 1.56 |

TABLE 22

Example 8 Lens data

| Si | Ri | Di | Ndj | νdj |
|---|---|---|---|---|
| 1 | 27.2345 | 1.2000 | 1.77250 | 49.6 |
| 2 | 4.4167 | 0.5013 | | |
| 3* | 1.2500 | 1.2997 | 1.53159 | 55.4 |
| 4* | 0.5703 | 1.4508 | | |
| 5* | 3.1975 | 2.1480 | 1.61396 | 25.5 |
| 6* | −7.4287 | 0.4474 | | |
| 7 (Aperture diaphragm) | ∞ | 0.2555 | | |
| 8* | −18.3377 | 1.6390 | 1.53159 | 55.4 |
| 9* | −0.9939 | 0.8000 | | |
| 10 | ∞ | 0.7000 | 1.52310 | 54.5 |
| 11 | ∞ | 0.7724 | | |
| Image surface | ∞ | | | |

Example 8 Various kinds of data

| | |
|---|---|
| Fno. | 2.8 |
| 2ω | 184.4 |
| L | 10.97 |
| Bf | 2.03 |
| f | 1.17 |
| f1 | −6.98 |
| f2 | −5.87 |
| f3 | 3.94 |
| f4 | 1.91 |
| ED1 | 10.95 |
| f12 | −2.29 |

TABLE 23

Example 8 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −3.5985040E−02 | −2.2019139E−01 | −5.4697732E−03 | 4.2031089E−02 | −3.8059449E−02 | 4.0992522E−02 |
| RB4 | −1.6281238E−02 | 3.0417692E−02 | 1.6821579E−02 | 2.4011959E−02 | 5.8932137E−01 | −1.4989620E−01 |
| RB5 | −1.6075824E−03 | −2.1717098E−02 | 5.8481380E−03 | −3.8010208E−02 | −3.7989737E+00 | 2.6035047E−01 |
| RB6 | −9.5489804E−05 | 2.7954770E−03 | −1.5682298E−02 | 1.4755709E−02 | 8.6636700E+00 | −1.2644322E−01 |
| RB7 | 3.7102395E−05 | 2.1046851E−03 | 3.9306590E−03 | 2.3484757E−02 | −1.7539424E+00 | −5.0535684E−02 |
| RB8 | 2.8616410E−05 | 6.2899648E−04 | 1.6676891E−03 | −3.4046344E−03 | −1.4056264E+01 | 1.0490387E−02 |
| RB9 | 7.4976610E−06 | 5.9681670E−05 | −1.3814259E−03 | −2.3407590E−02 | −1.5094733E+01 | 2.0702189E−02 |
| RB10 | 1.5095432E−06 | −3.2187008E−05 | −9.7254668E−04 | −1.3178825E−02 | 3.4961486E+01 | 9.7084855E−03 |
| RB11 | 2.2867768E−07 | −2.2086056E−05 | 5.1411884E−04 | 2.2115455E−02 | 7.4660722E+01 | −1.4094296E−03 |
| RB12 | −1.2770553E−08 | 3.6358106E−06 | 2.0119859E−04 | 1.7298337E−02 | −4.1688712E+01 | −3.4227192E−03 |
| RB13 | −2.7902790E−09 | −5.2943348E−06 | 5.7249437E−06 | −1.9417369E−02 | −1.3891012E+02 | −2.7170057E−03 |
| RB14 | −1.7028669E−09 | −3.2826706E−06 | −3.0075400E−05 | −5.8103953E−03 | −5.4903532E+01 | −1.2350105E−03 |
| RB15 | −7.9223903E−10 | −1.8829249E−06 | −1.7754327E−05 | 9.3980439E−03 | 9.7586467E+01 | −1.1670601E−04 |
| RB16 | −2.5609987E−10 | −8.0852168E−07 | −3.4940554E−06 | −2.0905805E−03 | −1.0855720E+02 | 3.2374738E−04 |
| RB17 | −8.5021409E−11 | 4.6559269E−08 | 9.2580719E−07 | −4.3674411E−04 | 7.6715938E+02 | 4.1523462E−04 |
| RB18 | −2.1393959E−11 | 2.1498241E−07 | 1.2663081E−06 | 1.0542650E−03 | −9.8298759E+01 | 4.6769574E−04 |
| RB19 | −5.1985719E−12 | 1.4818694E−07 | 4.7236607E−07 | −9.7256979E−04 | −1.3344215E+03 | 6.7183763E−05 |
| RB20 | −1.1003113E−12 | −5.0899042E−08 | −2.2430871E−07 | 2.9996370E−04 | 8.3401478E+02 | −1.9585145E−04 |

TABLE 24

Example 8 Data related to curvature radius

| Surface number | Effective diameter end | | Ratio of effective diameter end to center | |
|---|---|---|---|---|
| 3 | \|RX3\| | 35.75 | \|RX3\|/\|R3\| | 28.60 |
| 4 | \|RX4\| | 2.45 | \|RX4\|/\|R4\| | 4.30 |
| 5 | \|RX5\| | 2.20 | \|RX5\|/\|R5\| | 0.69 |
| 6 | \|RX6\| | 83.88 | \|RX6\|/\|R6\| | 11.29 |
| 8 | \|RX8\| | 6.07 | \|RX8\|/\|R8\| | 0.33 |
| 9 | \|RX9\| | 1.51 | \|RX9\|/\|R9\| | 1.52 |

TABLE 25

Example 9 Lens data

| Si | Ri | Di | Ndj | νdj |
|---|---|---|---|---|
| 1 | 30.4483 | 1.0000 | 1.77250 | 49.6 |
| 2 | 3.4993 | 0.8264 | | |
| 3* | 1.3338 | 1.2990 | 1.53159 | 55.4 |
| 4* | 0.6828 | 0.8541 | | |
| 5* | 2.7801 | 2.1455 | 1.61396 | 25.5 |
| 6* | −3.8916 | 0.4404 | | |
| 7 (Aperture diaphragm) | ∞ | 0.3382 | | |
| 8* | −3.8927 | 1.6577 | 1.53159 | 55.4 |
| 9* | −1.0839 | 0.8000 | | |
| 10 | ∞ | 0.7000 | 1.52310 | 54.5 |
| 11 | ∞ | 1.1592 | | |
| Image surface | ∞ | | | |

Example 9 Various kinds of data

| | |
|---|---|
| Fno. | 2.8 |
| 2ω | 184.0 |
| L | 10.98 |
| Bf | 2.42 |
| f | 1.51 |
| f1 | −5.20 |
| f2 | −8.56 |
| f3 | 3.01 |
| f4 | 2.34 |
| ED1 | 8.26 |
| f12 | −2.21 |

TABLE 26

Example 9 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −6.5598440E−02 | −2.4523923E−01 | 1.7637326E−02 | 2.8651748E−02 | −2.2670089E−02 | 3.6818240E−02 |
| RB4 | −1.9260381E−02 | 2.8745665E−02 | 3.8871738E−03 | 2.6903008E−02 | 5.9556641E−01 | −1.4391035E−01 |
| RB5 | −1.9127954E−03 | −2.2084511E−02 | 3.8248109E−03 | −3.3403150E−02 | −3.7991024E+00 | 2.6278562E−01 |
| RB6 | −1.1896934E−04 | 2.6203142E−03 | −1.7189052E−03 | 1.7052792E−02 | 8.6631693E+00 | −1.2572886E−01 |
| RB7 | 3.7845566E−05 | 2.0501827E−03 | 3.3561676E−03 | 2.4241346E−02 | −1.7541379E+03 | −5.0369565E−02 |
| RB8 | 2.9180626E−05 | 6.1260762E−04 | 1.6888191E−03 | −3.2288554E−03 | −1.4056317E+01 | 1.0522385E−02 |
| RB9 | 7.6904173E−06 | 5.5113398E−05 | −1.3738852E−03 | −2.3399522E−02 | −1.5094745E+01 | 2.0706626E−02 |
| RB10 | 1.5370870E−06 | −3.3396114E−05 | −9.7034070E−04 | −1.3197446E−02 | 3.4961484E+01 | 9.7085082E−03 |
| RB11 | 2.2823894E−07 | −2.2388850E−05 | 5.1469793E−04 | 2.2101574E−02 | 7.4660721E+01 | −1.4097280E−03 |
| RB12 | −1.5163482E−08 | 3.5642338E−06 | 2.0139918E−04 | 1.7291229E−02 | −4.1688712E+01 | −3.4228742E−03 |
| RB13 | −3.8576533E−09 | −5.3113650E−06 | 5.7567256E−06 | −1.9420470E−02 | −1.3891012E+02 | −2.7170650E−03 |
| RB14 | −2.0710134E−09 | −3.2866466E−06 | −3.0068767E−05 | −5.8116253E−03 | −5.4903532E+01 | −1.2350305E−03 |
| RB15 | −9.0451782E−10 | −1.8838399E−06 | −1.7753092E−05 | 9.3975873E−03 | 9.7566467E+01 | −1.1671228E−04 |
| RB16 | −2.8788754E−10 | −8.0873014E−07 | −3.4938712E−06 | −2.0907417E−03 | −1.0855720E+02 | 3.2374550E−04 |
| RB17 | −9.3691191E−11 | 4.6511994E−08 | 9.2581828E−07 | −4.3679877E−04 | 7.6715938E+02 | 4.1523407E−04 |
| RB18 | −2.3605268E−11 | 2.1492167E−07 | 1.2663014E−06 | 1.0542471E−03 | −9.8293759E+01 | 4.6769559E−04 |
| RB19 | −5.7542139E−12 | 1.4818447E−07 | 4.7236183E−07 | −9.7257550E−04 | −1.3344215E+03 | 6.7183720E−05 |
| RB20 | −1.2365358E−12 | −5.0899620E−08 | −2.2431046E−07 | 2.9996370E−04 | 8.3401478E+02 | −1.9585146E−04 |

TABLE 27

Example 9 Data related to curvature radius

| Surface number | Effective diameter end | | Ratio of effective diameter end to center | |
|---|---|---|---|---|
| 3 | |RX3| | 7.69 | |RX3|/|R3| | 5.76 |
| 4 | |RX4| | 3.53 | |RX4|/|R4| | 5.17 |
| 5 | |RX5| | 2.18 | |RX5|/|R5| | 0.79 |
| 6 | |RX6| | 11.15 | |RX6|/|R6| | 2.87 |
| 8 | |RX8| | 3.12 | |RX8|/|R8| | 0.80 |
| 9 | |RX9| | 1.60 | |RX9|/|R9| | 1.48 |

TABLE 28

Example 10 Lens data

| Si | Ri | Di | Ndj | vdj |
|---|---|---|---|---|
| 1 | 29.8998 | 1.0000 | 1.77250 | 49.6 |
| 2 | 3.4991 | 0.8342 | | |
| 3* | 1.3122 | 1.2981 | 1.53159 | 55.4 |
| 4* | 0.6889 | 0.8465 | | |
| 5* | 2.7524 | 2.1427 | 1.61396 | 25.5 |
| 6* | −3.7392 | 0.4341 | | |
| 7 (Aperture diaphragm) | ∞ | 0.3312 | | |
| 8* | −3.7275 | 1.5600 | 1.53159 | 55.4 |
| 9* | −1.1453 | 0.8000 | | |
| 10 | ∞ | 0.7000 | 1.52310 | 54.5 |
| 11 | ∞ | 1.2753 | | |
| Image surface | ∞ | | | |

Example 10 Various kinds of data

| | |
|---|---|
| Fno. | 2.8 |
| 2ω | 183.2 |
| L | 10.98 |
| Bf | 2.53 |
| f | 1.68 |
| f1 | −5.22 |
| f2 | −9.85 |
| f3 | 2.95 |
| f4 | 2.57 |
| ED1 | 8.24 |
| f12 | −2.31 |

TABLE 29

Example 10 Aspheric data

| Si | 3 | 4 | 5 | 6 | 8 | 9 |
|---|---|---|---|---|---|---|
| KA | 0.0000000E+00 | 0.0000000E+00 | 0.0000000E+00 | 0.0000000E+00 | 0.0000000E+00 | 0.0000000E+00 |
| RB3 | −6.8213576E−02 | −2.5077078E−01 | 1.3102727E−02 | 2.6302052E−02 | −3.3217719E−02 | 2.2121954E−02 |
| RB4 | −1.9700354E−02 | 2.8339731E−02 | 4.2916937E−04 | 2.6344774E−02 | 5.9644509E−01 | −1.4971053E−01 |
| RB5 | −1.9894160E−03 | −2.2099581E−02 | 3.4024173E−03 | −3.2863427E−02 | −3.7972439E+00 | 2.6167718E−01 |
| RB6 | −1.3072386E−04 | 2.6151162E−03 | −1.7091648E−03 | 1.7581496E−02 | 8.6639685E+00 | −1.2586887E−01 |
| RB7 | 3.6417540E−05 | 2.0483532E−03 | 3.3759135E−03 | 2.4536232E−02 | −1.7538969E+00 | −5.0378436E−02 |
| RB8 | 2.9054724E−05 | 6.1240669E−04 | 1.6955625E−03 | −3.0956062E−03 | −1.4056253E+01 | 1.0522957E−02 |
| RB9 | 7.0841422E−08 | 5.5225233E−05 | −1.3722038E−03 | −2.3345753E−02 | −1.5094730E+01 | 2.0706573E−02 |
| RB10 | 1.5397561E−08 | −3.3311180E−05 | −9.6999045E−04 | −1.3177249E−02 | 3.4961488E+01 | 9.7082682E−03 |
| RB11 | 2.2910436E−07 | −2.2351684E−05 | 5.1475903E−04 | 2.2108787E−02 | 7.4660722E+01 | −1.4098721E−03 |
| RB12 | −1.4968027E−08 | 3.5775102E−06 | 2.0134700E−04 | 1.7293708E−02 | −4.1688712E+01 | −3.4229349E−03 |
| RB13 | −3.8201450E−09 | −5.3071294E−06 | 5.7568153E−06 | −1.9419644E−02 | −1.3891012E+02 | −2.7170866E−03 |

TABLE 29-continued

Example 10 Aspheric data

| Si | 3 | 4 | 5 | 6 | 8 | 9 |
|---|---|---|---|---|---|---|
| RB14 | −2.0645786E−09 | −3.2853884E−06 | −3.0069181E−05 | −5.8113572E−03 | −5.4903532E+01 | −1.2350374E−03 |
| RB15 | −9.0352162E−10 | −1.8834638E−06 | −1.7753293E−05 | 0.3976725E−03 | 9.7566467E+01 | −1.1671437E−04 |
| RB16 | −2.8775171E−10 | −8.0863280E−07 | −3.4939430E−06 | −2.0907152E−03 | −1.0855720E+02 | 3.2374490E−04 |
| RB17 | −9.3676208E−11 | 4.6537922E−08 | 9.2579578E−07 | −4.3670065E−04 | 7.6715938E+02 | 4.1523391E−04 |
| RB18 | −2.3604458E−11 | 2.1492844E−07 | 1.2662948E−06 | 1.0542495E−03 | −9.8293759E+01 | 4.6769554E−04 |
| RB19 | −5.7544264E−12 | 1.4818621E−07 | 4.7235998E−07 | −9.7257478E−04 | −1.3344215E−03 | 6.7183708E−05 |
| RB20 | −1.2366382E−12 | −5.0899177E−08 | −2.2431096E−07 | 2.9996370E−04 | 8.3401478E+02 | −1.9585146E−04 |

TABLE 30

Example 10 Data related to curvature radius

| Surface number | Effective diameter end | | Ratio of effective diameter end to center | |
|---|---|---|---|---|
| 3 | |RX3| | 6.91 | |RX3|/|R3| | 5.27 |
| 4 | |RX4| | 4.28 | |RX4|/|R4| | 6.22 |
| 5 | |RX5| | 2.28 | |RX5|/|R5| | 0.83 |
| 6 | |RX6| | 10.76 | |RX6|/|R6| | 2.88 |
| 8 | |RX8| | 2.91 | |RX8|/|R8| | 0.78 |
| 9 | |RX9| | 1.55 | |RX9|/|R9| | 1.36 |

TABLE 31

Example 11 Lens data

| Si | Ri | Di | Ndj | νdj |
|---|---|---|---|---|
| 1 | 17.0298 | 1.0032 | 1.77250 | 49.6 |
| 2 | 3.9571 | 1.7308 | | |
| 3* | 3.8273 | 1.2000 | 1.53389 | 56.0 |
| 4* | 1.5254 | 0.9952 | | |
| 5* | 5.0027 | 2.8399 | 1.61396 | 25.5 |
| 6* | −7.5316 | 0.3169 | | |
| 7 (Aperture diaphragm) | ∞ | 0.6000 | | |
| 8* | −1000.0000 | 2.5758 | 1.53389 | 56.0 |
| 9* | −1.1556 | 0.8000 | | |
| 10 | ∞ | 0.5000 | 1.51680 | 64.2 |
| 11 | ∞ | 1.1338 | | |
| Image surface | ∞ | | | |

Example 11 Various kinds of data

| Fno. | 2.0 |
|---|---|
| 2ω | 149.0 |
| L | 13.53 |
| Bf | 2.26 |
| f | 1.10 |
| f1 | −6.90 |
| f2 | −5.80 |
| f3 | 5.36 |
| f4 | 2.16 |
| ED1 | 10.48 |
| f12 | −2.53 |

TABLE 32

Example 11 Aspheric data

| Si | 3 | 4 | 5 | 6 | 8 | 9 |
|---|---|---|---|---|---|---|
| KA | −7.9943716E+00 | 2.7728200E−02 | −1.5389922E+02 | −1.4940743E+01 | 0.0000000E+00 | 8.3414600E−02 |
| RB3 | −3.4550440E−03 | −1.0021478E−02 | 1.0300373E−01 | 8.9430489E−03 | −5.6743121E−02 | −3.0199577E−03 |
| RB4 | −6.5283513E−04 | −4.3440364E−03 | −1.5255671E−02 | 6.7993179E−03 | −1.2952674E−02 | 1.6377891E−02 |
| RB5 | 1.1019453E−03 | 7.1649734E−04 | 1.9689772E−03 | 6.0006696E−04 | −4.6414993E−03 | −9.2047265E−04 |
| RB6 | −8.4652828E−04 | 3.1234979E−04 | 6.2285680E−04 | −3.0179310E−04 | −1.7142958E−03 | −1.4046213E−03 |
| RB7 | 2.4837945E−04 | 1.9165842E−03 | −3.3708230E−05 | −1.5785908E−03 | 2.1454934E−03 | −5.8647989E−04 |
| RB8 | −6.1565649E−05 | 3.3949277E−05 | 1.5081634E−04 | −5.1453526E−04 | 2.5746702E−03 | −3.7049696E−04 |
| RB9 | 6.0456206E−05 | 5.3847066E−04 | −4.1597497E−05 | −3.6579789E−04 | 1.0343849E−03 | 4.7524364E−04 |
| RB10 | −1.5512753E−05 | −5.1102181E−04 | 2.7968405E−05 | −1.9409237E−04 | 1.4782091E−03 | −3.0122214E−04 |
| RB11 | −4.0181829E−06 | −1.9673650E−06 | 4.8464276E−06 | −2.2149697E−04 | 7.1590027E−04 | −2.3990942E−05 |
| RB12 | 1.8644440E−07 | 3.0374012E−07 | −1.0254003E−06 | −1.6811221E−04 | −6.6590609E−05 | −4.7531640E−06 |
| RB13 | 3.8121178E−07 | 8.7023242E−07 | −2.0085599E−06 | −1.1598448E−04 | −4.5243529E−04 | 1.3560305E−06 |
| RB14 | 8.5003204E−08 | 8.1706254E−07 | −1.6086137E−06 | −8.4384905E−05 | −3.8886668E−04 | 2.5517103E−06 |
| RB15 | −3.2040992E−09 | 6.0871009E−07 | −1.0309911E−06 | −2.8906654E−05 | 1.0213544E−04 | 2.1828784E−06 |
| RB16 | −2.6439237E−11 | −5.3661039E−09 | −1.0230862E−07 | 2.0878564E−05 | −1.5522448E−04 | 1.4659541E−06 |
| RB17 | −7.3853617E−12 | −1.1874355E−09 | −3.6412125E−08 | −6.2152849E−05 | 7.7434060E−04 | 7.7040882E−07 |
| RB18 | −1.3295758E−12 | 4.2183360E−10 | −6.3854374E−09 | 3.1606444E−04 | 1.6338136E−03 | 3.0369126E−07 |
| RB19 | 8.8223706E−14 | 9.6692323E−10 | 4.7089709E−09 | 9.9687344E−05 | −1.5350965E−03 | 2.0192855E−08 |
| RB20 | 2.4771836E−13 | 1.0784659E−09 | 7.1558627E−09 | 7.7103658E−04 | −3.5564150E−04 | −1.3450294E−07 |

TABLE 33

Example 11 Data related to curvature radius

| Surface number | Effective diameter end | | Ratio of effective diameter end to center | |
|---|---|---|---|---|
| 3 | \|RX3\| | 20.35 | \|RX3\|/\|R3\| | 5.32 |
| 4 | \|RX4\| | 2.56 | \|RX4\|/\|R4\| | 1.68 |
| 5 | \|RX5\| | 2.77 | \|RX5\|/\|R5\| | 0.55 |
| 6 | \|RX6\| | 10.96 | \|RX6\|/\|R6\| | 1.46 |
| 8 | \|RX8\| | 5.59 | \|RX8\|/\|R8\| | 0.01 |
| 9 | \|RX9\| | 1.95 | \|RX9\|/\|R9\| | 1.69 |

In all of the imaging lenses according to Examples 1 to 11, the first lens L1 is a spherical glass lens. One surface or both surfaces of the first lens L1 may be aspheric surfaces. When the first lens L1 is an aspheric glass lens, it is possible to effectively correct all aberrations.

In the imaging lenses according to Examples 1 to 11, the second lens L2, the third lens L3, and the fourth lens L4 are all made of plastic. Therefore, it is possible to manufacture inexpensive lenses with a light weight.

Table 34 shows values corresponding to Conditional expressions 1 to 15 of the imaging lenses according to Examples 1 to 11. In Examples 1 to 11, the d-line is a reference wavelength, and Table 34 shows each value at the reference wavelength. As can be seen from Table 34, all of Examples 1 to 8 satisfy Conditional expressions 1 to 15.

TABLE 34

| | Conditional expression | | | | | | | |
|---|---|---|---|---|---|---|---|---|
| Example | (1) $f2/f$ | (2) ED1/D1 | (3) DX3 | (4) [RX3]/f | (5) R3/f | (6) L/f | (7) f1/f | (8) D2/f |
| 1 | −5.57 | 8.47 | 1.45 | 4.71 | 1.03 | 8.83 | −4.40 | 0.40 |
| 2 | −5.95 | 8.55 | 1.46 | 4.68 | 1.01 | 8.75 | −4.33 | 0.41 |
| 3 | −6.65 | 8.43 | 1.44 | 4.75 | 0.99 | 8.70 | −4.31 | 0.40 |
| 4 | −7.64 | 8.41 | 1.44 | 4.80 | 0.96 | 8.52 | −4.21 | 0.39 |
| 5 | −8.62 | 8.40 | 1.43 | 4.80 | 0.94 | 8.44 | −4.16 | 0.38 |
| 6 | −8.62 | 9.21 | 1.57 | 7.16 | 1.02 | 9.53 | −4.87 | 0.43 |
| 7 | −10.57 | 9.15 | 1.56 | 7.44 | 0.97 | 9.30 | −4.70 | 0.42 |
| 8 | −5.02 | 9.12 | 1.32 | 30.62 | 1.07 | 9.40 | −5.98 | 0.43 |
| 9 | −5.66 | 8.26 | 0.58 | 5.08 | 0.88 | 7.26 | −3.44 | 0.55 |
| 10 | −5.87 | 8.24 | 0.56 | 4.12 | 0.78 | 6.55 | −3.11 | 0.50 |
| 11 | −5.27 | 10.45 | 0.53 | 18.49 | 3.48 | 12.29 | −6.27 | 1.57 |

| | Conditional expression | | | | | | |
|---|---|---|---|---|---|---|---|
| Example | (9) f12/f | (10) R1/f | (11) D4/f | (12) D3/f | (13) (R3 − R4)/(R3 + R4) | (14) D1/f | (15) \|RX4/R4\| |
| 1 | −1.70 | 21.23 | 1.03 | 1.05 | 0.35 | 0.97 | 3.71 |
| 2 | −1.70 | 20.65 | 1.01 | 1.07 | 0.35 | 0.95 | 3.69 |
| 3 | −1.78 | 20.86 | 1.00 | 1.03 | 0.33 | 0.95 | 3.68 |
| 4 | −1.83 | 20.42 | 0.98 | 1.01 | 0.32 | 0.93 | 3.68 |
| 5 | −1.87 | 20.19 | 0.96 | 1.00 | 0.31 | 0.92 | 3.67 |
| 6 | −2.05 | 23.77 | 1.26 | 1.13 | 0.33 | 1.04 | 3.83 |
| 7 | −2.10 | 23.06 | 1.22 | 1.10 | 0.32 | 1.02 | 3.87 |
| 8 | −1.96 | 23.32 | 1.24 | 1.11 | 0.37 | 1.03 | 4.30 |
| 9 | −1.46 | 20.14 | 0.56 | 0.86 | 0.32 | 0.66 | 5.17 |
| 10 | −1.38 | 17.83 | 0.50 | 0.77 | 0.31 | 0.60 | 6.22 |
| 11 | −2.30 | 15.47 | 0.90 | 1.09 | 0.43 | 0.91 | 1.68 |

FIGS. 13A to 13I, FIGS. 14A to 14I, FIGS. 15A to 15I, FIGS. 16A to 16I, FIGS. 17A to 17I, FIGS. 18A to 18I, FIGS. 19A to 19I, FIGS. 20A to 20I, FIGS. 21A to 21I, FIGS. 22A to 22I, and FIGS. 23A to 23I are aberration diagrams illustrating the spherical aberration, astigmatism, distortion, lateral chromatic aberration, and lateral aberration of the imaging lenses according to Examples 1 to 11.

The aberration diagrams according to Example 1 will be described below as an example, which is the same with the aberration diagrams according to the other examples. FIG. 13A, FIG. 13B, FIG. 13C, and FIG. 13D are aberration diagrams respectively illustrating the spherical aberration, astigmatism, distortion, and lateral chromatic aberration of the imaging lens according to Example 1, FIGS. 13E to 13G are aberration diagrams illustrating lateral aberration in the tangential direction at each angle of view, and FIGS. 13H to 13I are aberration diagrams illustrating lateral aberration in the sagittal direction at each angle of view.

In the spherical aberration diagram, Fno. means the F number. In the other aberration diagrams, ω means a half angle of view. The distortion diagram shows the amount of deviation from an ideal image height f×tan (φ) (where f indicates the focal length of the entire system and φ indicates an angle of view (which is treated as a variable; $0 \leq \phi \leq \omega$). Each of the aberration diagrams shows aberration in the tangential direction and the sagittal direction at each half angle of view so as to be aligned with the horizontal direction. Since lateral aberration in the tangential direction and lateral aberration in the sagittal direction are equal to each other on the optical axis where ω is 0°, a diagram illustrating lateral aberration in the sagittal direction on the optical axis is omitted. Each aberration diagram shows aberration with respect to the d-line (587.56 nm), which is the reference wavelength. However, the spherical aberration diagram and the lateral chromatic aberration diagram also show aberrations with respect to the F-line (wavelength: 486.13 nm) and the C-line (wavelength: 656.27 nm).

As can be seen from the above-mentioned data, each of the imaging lenses according to Examples 1 to 11 includes a small number of lenses, for example, four lenses, a small size, a low manufacturing cost, a small F number of 2.0 to 2.8, and a total angle of view of 149° to 184°, which is a wide angle of view. In addition, in the imaging lenses, the effective diameter of the object-side surface of the first lens L1 is equal to or less than 12 mm and a small portion is exposed to the outside. All aberrations of the imaging lenses are effectively corrected and the imaging lenses have good optical performances. The imaging lenses can be appropriately applied to, for example, monitoring cameras or in-vehicle cameras for capturing the images of the front, side and rear of the vehicle.

FIG. 18 shows an example in which an imaging apparatus including the imaging lens according to this embodiment is provided in a vehicle 100. In FIG. 18, the vehicle 100 includes an outside-vehicle camera 101 for capturing the image of a blind spot area of the passenger seat side, an outside-vehicle camera 102 for capturing the image of a blind spot area of the rear side of the vehicle 100, and an in-vehicle camera 103 that is attached to the rear surface of a room mirror and captures the same visual field range as that of a driver. The outside-vehicle camera 101, the outside-vehicle camera 102, and the in-vehicle camera 103 are the imaging apparatuses according to the embodiment of the invention, and include the imagine lens according to the embodiment of the invention and an imaging device that converts an optical image formed by the imaging lens into an electric signal.

Since the imaging lens according to the embodiment of the invention has the above-mentioned advantages, the outside-vehicle cameras 101 and 102 and the in-vehicle camera 103 do not deteriorate the appearance of the vehicle, have a small size, a low manufacturing cost, a wide angle of view, and can obtain high-quality images.

The embodiments and examples of the invention have been described above, but the invention is not limited to the embodiments and examples. Various modifications and changes of the invention can be made. For example, the curvature radius, surface spacing, refractive index, Abbe number, and aspheric coefficient of each lens component are not limited to the values described in each numerical example, but may have other values.

In the above-described embodiment of the invention, the imaging apparatus is applied to the in-vehicle camera, but the purpose of the invention is not limited thereto. For example, the invention can be applied to cameras for portable terminals or monitoring cameras.

What is claimed is:

1. An imaging lens comprising:
   a first negative lens having a meniscus shape in which a concave surface faces an image side;
   a second negative lens having a meniscus shape in which a concave surface faces the image side and including at least one aspheric surface;
   a third positive lens including at least one aspheric surface;
   a stop; and
   a fourth positive lens including at least one aspheric surface,
   wherein the first to fourth lenses are arranged in this order from an object side, and
   the imaging lens satisfies the following conditional expression:

$f2/f<-4.5$ where f indicates the focal length of the entire system and f2 indicates the focal length of the second lens.

2. An imaging lens according to claim 1:
   wherein
   the imaging lens satisfies the following conditional expression:

$4.0<ED1/D1<15.0$ where ED1 indicates the effective diameter of an object-side surface of the first lens and D1 indicates the thickness of the center of the first lens.

3. The imaging lens according to claim 1, wherein an object-side surface of the second lens is configured such that an effective diameter edge is disposed closer to the image side than an intersection point between the object-side surface and an optical axis, and the imaging lens satisfies the following conditional expression:

$DX3 \geq 0.5$ mm where DX3 indicates the distance between an intersection point between the optical axis and a perpendicular line that drops from the effective diameter edge to the optical axis and the center of the object-side surface in an optical axis direction.

4. The imaging lens according to claim 1,
   wherein the imaging lens satisfies the following conditional expression:

$2.5<|RX3|/f$ where f indicates the focal length of the entire system and RX3 indicates the curvature radius of the object-side surface of the second lens at the effective diameter edge.

5. The imaging lens according to claim 1,
   wherein the imaging lens satisfies the following conditional expression:

$0.7<R3/f<4.0$ where f indicates the focal length of the entire system and R3 indicates the curvature radius of the object-side surface of the second lens at the center.

6. The imaging lens according to claim 1,
   wherein the imaging lens satisfies the following conditional expression:

$7.5<L/f<13.0$ where f indicates the focal length of the entire system and L indicates the distance from the object-side surface of the first lens to an image plane in the optical axis direction.

7. The imaging lens according to claim 1,
   wherein the imaging lens satisfies the following conditional expression:

$-8.0<f1/f<-3.0$ where f indicates the focal length of the entire system and f1 indicates the focal length of the first lens.

8. The imaging lens according to claim 1,
   wherein the imaging lens satisfies the following conditional expression:

$0.3<D2/f<2.0$ where f indicates the focal length of the entire system and D2 indicates an air space between the first lens and the second lens on the optical axis.

9. The imaging lens according to claim 1,
   wherein the imaging lens satisfies the following conditional expression:

$-3.5<f12/f<-0.7$ where f indicates the focal length of the entire system and f12 indicates a composite focal length of the first lens and the second lens.

10. The imaging lens according to claim 1,
    wherein the imaging lens satisfies the following conditional expression:

$15<R1/f<30$ where f indicates the focal length of the entire system and R1 indicates the curvature radius of the object-side surface of the first lens.

11. An imaging apparatus comprising the imaging lens according to claim 1.

12. The imaging lens according to claim 1, wherein
    each surface of the second lens includes an aspheric surface,
    each surface of the third lens includes an aspheric surface, and
    each surface of the fourth lens includes an aspheric surface.

* * * * *